(12) United States Patent
Low et al.

(10) Patent No.: US 12,139,105 B2
(45) Date of Patent: *Nov. 12, 2024

(54) TAILGATE PAD

(71) Applicant: Fox Factory, Inc., Duluth, GA (US)

(72) Inventors: Siupo Low, Vancouver (CA); Gary Schreiber, Surrey (CA); Vincent Huynh, Burnaby (CA); Anastasiia Tekhteleva, Burnaby (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,748

(22) Filed: Sep. 15, 2023

(65) Prior Publication Data

US 2024/0001860 A1 Jan. 4, 2024

Related U.S. Application Data

(63) Continuation of application No. 17/335,990, filed on Jun. 1, 2021, now Pat. No. 11,760,271, which is a continuation-in-part of application No. 16/851,002, filed on Apr. 16, 2020, now Pat. No. 11,491,856.

(60) Provisional application No. 62/836,472, filed on Apr. 19, 2019.

(51) Int. Cl.
*B60R 9/06* (2006.01)
*B60J 11/06* (2006.01)
*B60R 9/10* (2006.01)
*B60R 13/01* (2006.01)
*B62D 33/027* (2006.01)

(52) U.S. Cl.
CPC ............... *B60R 9/06* (2013.01); *B60J 11/06* (2013.01); *B60R 9/10* (2013.01); *B60R 13/01* (2013.01); *B62D 33/0273* (2013.01)

(58) Field of Classification Search
CPC .... B60J 11/06; B62D 33/023; B62D 33/0273; B62D 33/03; B60R 9/06; B60R 9/10; B60R 11/06; B60R 13/01; B60R 13/04; B60R 13/43; G09F 21/048; B65D 65/10
See application file for complete search history.

(56) References Cited

U.S. PATENT DOCUMENTS

| | | | |
|---|---|---|---|
| 5,129,695 A * | 7/1992 | Norman | B60J 11/06 293/128 |
| 5,255,464 A * | 10/1993 | Marecek | G09F 21/048 40/591 |
| 5,799,975 A | 9/1998 | Crick | |
| 6,247,742 B1 * | 6/2001 | Boudreaux | B62D 33/0273 296/57.1 |
| 6,254,170 B1 * | 7/2001 | Farmer | B60J 11/06 150/166 |
| 6,286,885 B1 | 9/2001 | Ramos | |
| 6,484,427 B1 * | 11/2002 | Santa Cruz | G09F 21/04 40/643 |
| 6,695,556 B2 | 2/2004 | Addy | |
| 6,749,250 B1 * | 6/2004 | Reid | G09F 21/048 296/57.1 |
| 8,061,761 B1 | 11/2011 | Sierra | |
| 9,522,767 B1 | 12/2016 | Pass | |
| 9,701,225 B1 | 7/2017 | Hogan et al. | |

(Continued)

*Primary Examiner* — Gregory A Blankenship

(57) ABSTRACT

A tailgate pad. The tailgate pad includes a front side. The tailgate pad also includes a back side. The tailgate pad further includes a fold out panel coupled with the front side, the fold out panel to wrap about at least a portion of a wheel of a vehicle.

20 Claims, 14 Drawing Sheets

(56) References Cited

U.S. PATENT DOCUMENTS

| | | | |
|---|---|---|---|
| 10,300,861 B1 | 5/2019 | Green et al. | |
| 10,343,617 B2 | 7/2019 | Cox | |
| 10,377,215 B2 | 8/2019 | Sierra | |
| 10,696,236 B1 | 6/2020 | Starkey | |
| 10,857,950 B2 | 12/2020 | Cox | |
| D969,049 S * | 11/2022 | He | D12/196 |
| 11,491,856 B2 * | 11/2022 | Low | B60R 9/10 |
| 11,634,086 B2 * | 4/2023 | Gu | B60R 9/10 224/403 |
| 11,760,271 B2 * | 9/2023 | Low | B60J 11/06 296/39.1 |
| 2002/0135202 A1 | 9/2002 | Rokahr | |
| 2003/0038497 A1 | 2/2003 | Fitzgerald | |
| 2005/0275241 A1 | 12/2005 | Rothwell | |
| 2008/0203752 A1 | 8/2008 | Warkentin | |
| 2013/0220185 A1 * | 8/2013 | Valenta | B65D 65/10 108/90 |
| 2017/0144614 A1 | 5/2017 | Depalma | |
| 2019/0337464 A1 | 11/2019 | Cox | |
| 2019/0344720 A1 | 11/2019 | Green et al. | |
| 2020/0215957 A1 | 7/2020 | Starkey | |
| 2020/0331332 A1 | 10/2020 | Low et al. | |
| 2021/0107416 A1 | 4/2021 | Stien | |
| 2022/0001808 A1 | 1/2022 | Low et al. | |
| 2022/0339996 A1 | 10/2022 | Malina et al. | |
| 2022/0379817 A1 | 12/2022 | Gu | |
| 2023/0059483 A1 * | 2/2023 | Low | B60J 11/06 |
| 2023/0286363 A1 * | 9/2023 | Madrid | B60J 11/06 |
| 2024/0001860 A1 * | 1/2024 | Low | B60J 11/06 |

* cited by examiner

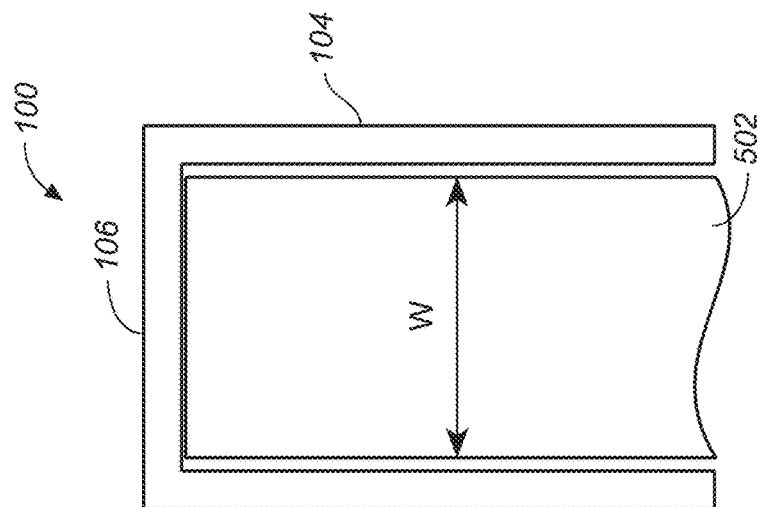
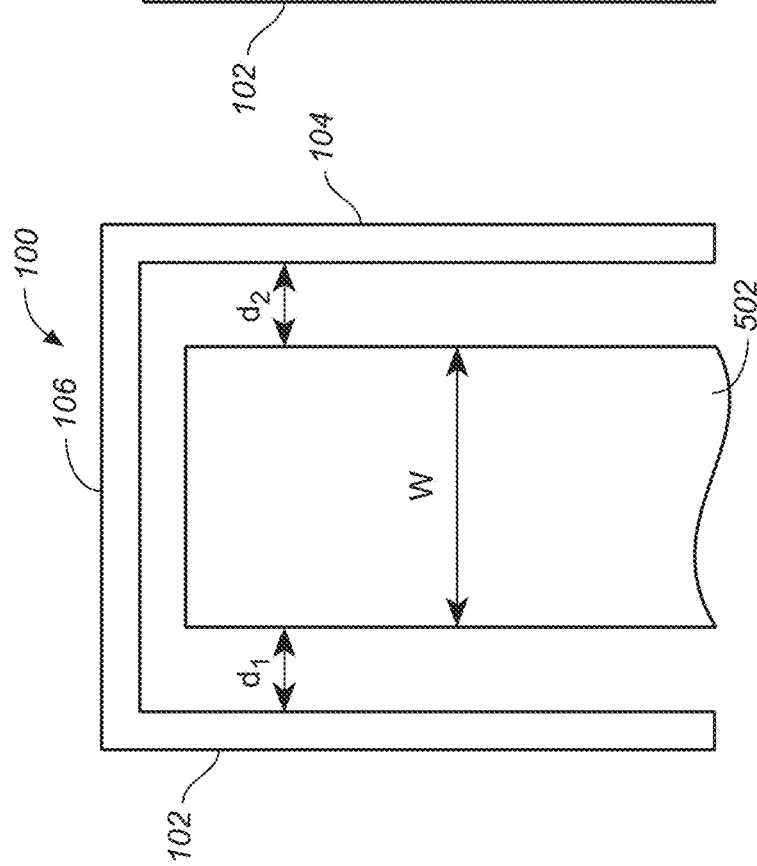
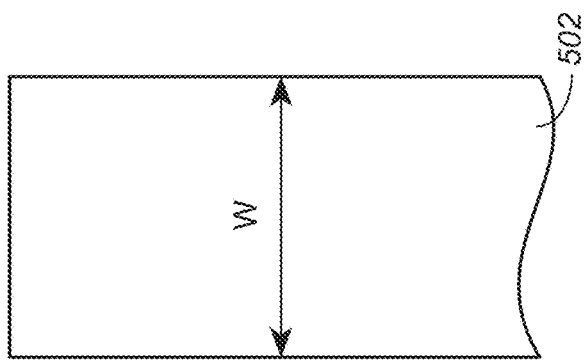

TAILGATE PAD

CROSS-REFERENCE TO RELATED APPLICATIONS

This application is a continuation of and claims priority to co-pending U.S. patent application Ser. No. 17/335,990 filed on Jun. 1, 2021, entitled "TAILGATE PAD" by Low et al., and assigned to the assignee of the present application, the disclosure of which is hereby incorporated by reference in its entirety.

The application Ser. No. 17/335,990 is a continuation-in-part of and claims priority to U.S. patent application Ser. No. 16/851,002 filed on Apr. 16, 2020, now U.S. Issued U.S. Pat. No. 11,491,856, entitled "ADJUSTABLE TAILGATE PAD" by Low et al., and assigned to the assignee of the present application, the disclosure of which is hereby incorporated by reference in its entirety.

The application Ser. No. 16/851,002 claims priority to and benefit of U.S. Provisional Patent Application No. 62/836,472 filed on Apr. 19, 2019, entitled "ADJUSTABLE TAILGATE PAD" by Low et al., and assigned to the assignee of the present application, the disclosure of which is hereby incorporated by reference in its entirety.

FIELD OF THE INVENTION

Embodiments of the present technology relate generally to a tailgate pad.

BACKGROUND

Many trucks and other vehicles include a tailgate. In some instances, owners of tailgate-equipped vehicles will utilize the tailgate when transporting, for example, a bicycle. For example, a truck owner will position a bicycle in the bed of the truck such that the front fork of the bicycle straddles the tailgate. In so doing, the front fork of the bicycle is located outside of the bed of the truck, while the rest of the bicycle is located inside of the bed of the truck. In such a position, the tailgate is disposed between the front fork and the rest of the bicycle frame, and, as a result, the tailgate supports the bicycle in an upright position. Hence, the tailgate can be used in lieu of, or in addition to, various bicycle carrier devices (e.g., bike racks). To prevent damage to the tailgate, and/or a bicycle straddling the tailgate, protective tailgate pads may be attached to the tailgate.

At present, there are significant variations in the structure and features of tailgates across various vehicle makers. Further, there are even significant variations in the structure and features of tailgates across vehicles from the same vehicle maker. As a result, in order to select an appropriate tailgate pad, a consumer is required to select a tailgate pad specifically designed to match the particular tailgate structure and the particular features of that consumer's vehicle.

BRIEF DESCRIPTION OF THE DRAWINGS

Aspects of the present invention are illustrated by way of example, and not by way of limitation, in the accompanying drawings, wherein:

FIGS. 5A, 5B and 5C are schematic representations of a tailgate and an adjustable tailgate pad, wherein the width of a top side of the adjustable tailgate pad is adjusted to fit the width of the tailgate, in accordance with embodiments of the present invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

As stated above, in some instances, owners of tailgate-equipped vehicles may utilize the tailgate when transporting, for example, a bicycle. For purposes of brevity and clarity, the following discussion will refer to the tailgate of a truck. It should be understood, however, that the present embodiments are also well suited to use with a tailgate of a vehicle other than a truck. Moreover, embodiments of the present invention are well suited for use when transporting, for example, a motorcycle. Additionally, embodiments of the present adjustable tailgate pad 100 are well suited to use with other items such as, for example, a surfboard, a paddleboard, lumber or other items which may be transported in the bed of a truck. That said, for purposes of brevity and clarity, and not to be interpreted as a limitation, the following discussion will describe embodiments of the present invention while referring to a truck tailgate being used to support a bicycle.

Figure 1:
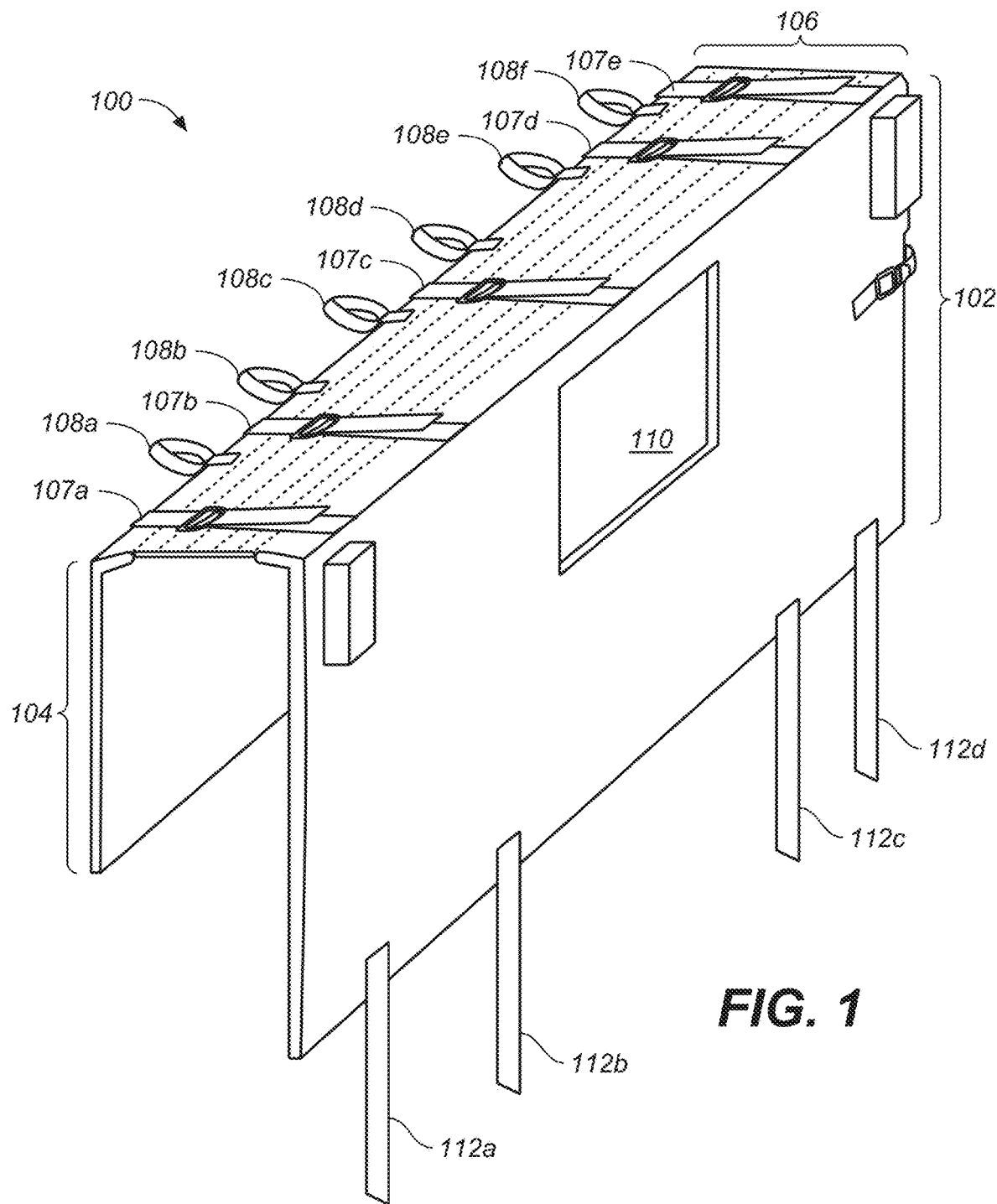
FIG. 1 is a perspective view of an adjustable tailgate pad, in accordance with embodiments of the present invention.

As will be described in detail below, embodiments of the present invention provide an adjustable tailgate pad. Referring now to FIG. 1, a perspective view of an adjustable tailgate pad 100 is shown, in accordance with embodiments of the present invention. Adjustable tailgate pad 100 of the present invention includes a front side 102, a back side 104 and a top side 106. It should be noted that each of front side 102, a back side 104 and a top side 106 are further comprised of a tailgate-facing surface and an exterior-facing surface. For purposes of brevity and clarity, and not to be interpreted as a limitation, the following discussion will describe embodiments of the present invention while generally referring to front side 102, a back side 104 and a top side 106. Occasionally, the following discussion will refer to a specific tailgate-facing surface and/or exterior-facing surface of front side 102, back side 104, and/or top side 106.

In embodiments of the present invention, top side 106 of adjustable tailgate pad 100 has a plurality of top side straps, typically shown as 107a-107e, coupled thereto. Although five top side straps 107a-107e are shown in the embodiment of FIG. 1, in some embodiments of the present invention, adjustable tailgate pad 100 will have more than five top side straps. Further, in some embodiments of the present invention, adjustable tailgate pad 100 will have less than five top side straps. Additionally, in some embodiments, the location and/or the spacing between the plurality of top side straps 107a-107e coupled to top side 106 will differ from the location and/or spacing of top side straps 107a-107e as depicted in FIG. 1. Top side straps 107a-107e of adjustable tailgate pad 100 will be discussed further below, in detail.

Referring still to FIG. 1, in embodiments of the present invention, adjustable tailgate pad 100 has a plurality of retaining straps, typically shown as 108a-108f, coupled thereto. In various embodiments of the present invention, retaining straps 108a-108f are used to strap a portion of a bicycle (e.g., a frame of a bicycle) against back surface 104 of adjustable tailgate pad 100. Although six retaining straps 108a-108f are shown in the embodiment of FIG. 1, in some embodiments of the present invention, adjustable tailgate pad 100 will have more than six retaining straps. Further, in some embodiments of the present invention, adjustable tailgate pad 100 will have less than six retaining straps. Additionally, in some embodiments, the location and/or the spacing between the plurality of retaining straps 108a-108f coupled to adjustable tailgate pad 100 will differ from the location and/or spacing of retaining straps 108a-108f as depicted in FIG. 1. Retaining straps 108a-108f of adjustable tailgate pad 100 will be discussed further below, in detail.

With reference still to FIG. 1, in various embodiments, adjustable tailgate pad 100 includes a window 110 formed in front side 102. In various embodiments of the present adjustable tailgate pad 100, as will be described in detail below, front side 102 has a window 110 formed therein. In various embodiments of the present invention, when window 110 of front side 102 is open, window 110 will expose, for example, a tailgate handle, a tailgate-mounted backup camera, or other tailgate features. In embodiments of the present invention, window 110 of adjustable tailgate pad 100 is rectangular in shape and approximately centered about the length of front side 102. Although such a location of window 110 is shown in the embodiment of FIG. 1, in some embodiments of the present invention, adjustable tailgate pad 100 will have window 110 disposed in front side 102 at a location other than as depicted in FIG. 1. Further, in some embodiments of the present invention, window 110 of adjustable tailgate pad 100 will have a non-rectangular shape. Window 110 of adjustable tailgate pad 100 will be discussed, in detail, further below. Further, as shown in FIG. 2 below, in some embodiments of the present invention, front surface 102 of adjustable tailgate pad 100 does not have a window formed therein.

Figure 2:
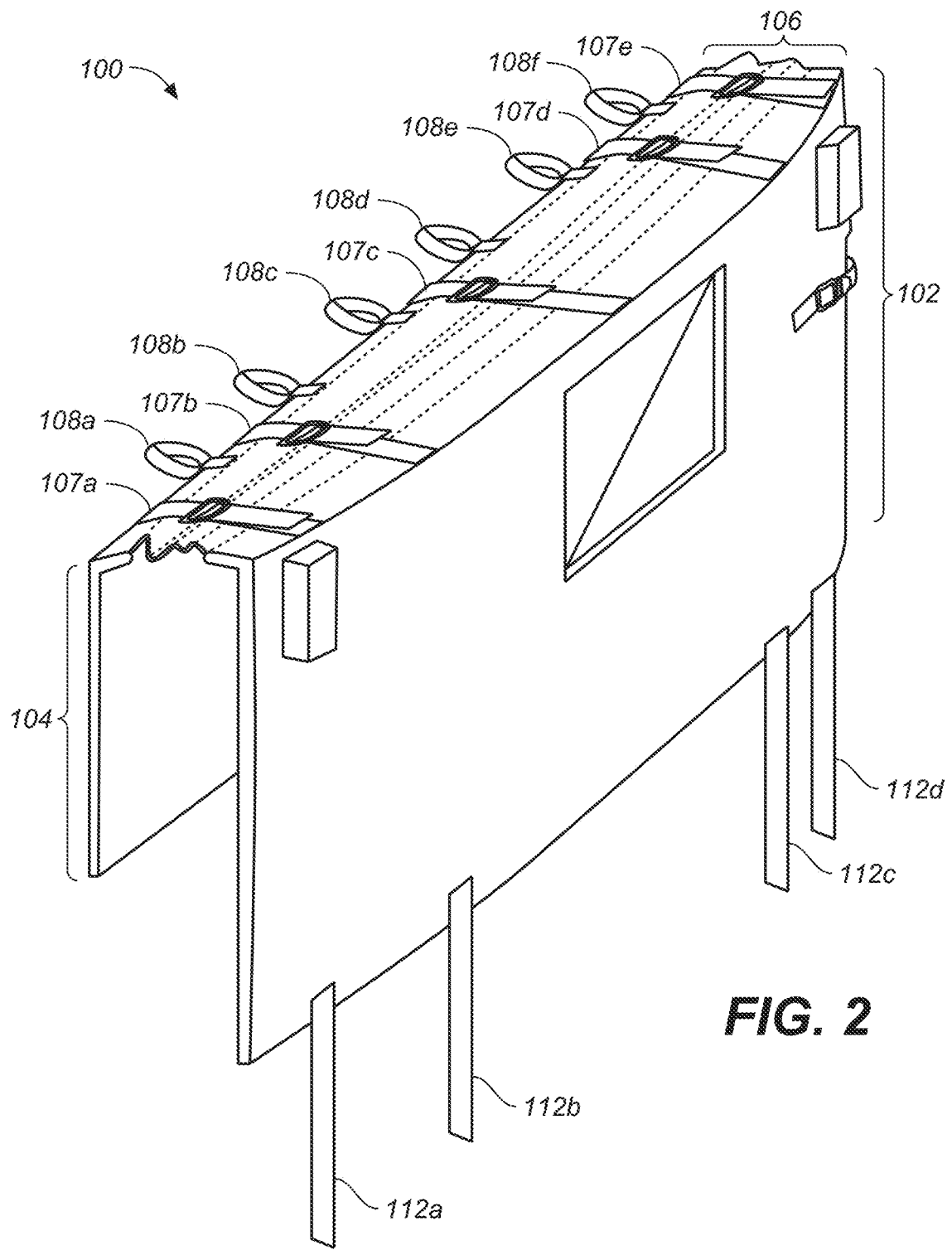
FIG. 2 is a perspective view of an adjustable tailgate pad wherein the front surface of the adjustable tailgate pad does not have a window formed therein, in accordance with embodiments of the present invention.

Referring now to FIG. 2, a perspective view of an adjustable tailgate pad 100 is shown wherein front surface 102 does not have a window (such as, e.g., window 110 of FIG. 1) formed therein, in accordance with embodiments of the present invention.

With reference again to FIG. 1, adjustable tailgate pad 100 also includes a plurality of front side straps, typically shown as 112a-112d, coupled thereto. Although four front side straps 112a-112d are shown in the embodiment of FIG. 1, in some embodiments of the present invention, adjustable tailgate pad 100 will have more than four front side straps. Further, in some embodiments of the present invention, adjustable tailgate pad 100 will have less than four front side straps. Additionally, in some embodiments, the location and/or the spacing between the plurality of front side straps 112a-112d coupled to front side 102 will differ from the location and/or spacing of front side straps 112a-112d as depicted in FIG. 1.

Referring still to FIG. 1, in various embodiments, front side straps 112a-112d are used to secure adjustable tailgate pad 100 to a tailgate. In one such embodiment, front side straps 112a-112d are placed under the bottom portion of a tailgate and are then coupled with a strap receiving feature, not numbered in FIG. 1, located on back side 104 of adjustable tailgate pad 100. One example of a strap receiving feature may include, but is not limited, a cinch ring, a back side strap, a portion of a hook-and-loop fastener to mate with corresponding portion of a hook-and-loop fastener on a front side strap, etc.

Although not shown in FIG. 1, in some embodiments of the present invention, back side 104 of adjustable tailgate pad 100 will have back side straps coupled thereto. In one such embodiment, the back side straps are placed under the bottom portion of a tailgate and are then coupled with a strap receiving feature, not numbered in FIG. 1, located on front side 102 of adjustable tailgate pad 100. In various embodiments of the present invention, back side straps are used to secure adjustable tailgate pad 100 to a tailgate in a manner as was described above with respect to front side straps 112a-112d. It should be noted that in various embodiments of the present invention, a combination of front side straps and back side straps are used to secure adjustable tailgate pad 100 to a tailgate.

Figure 3:
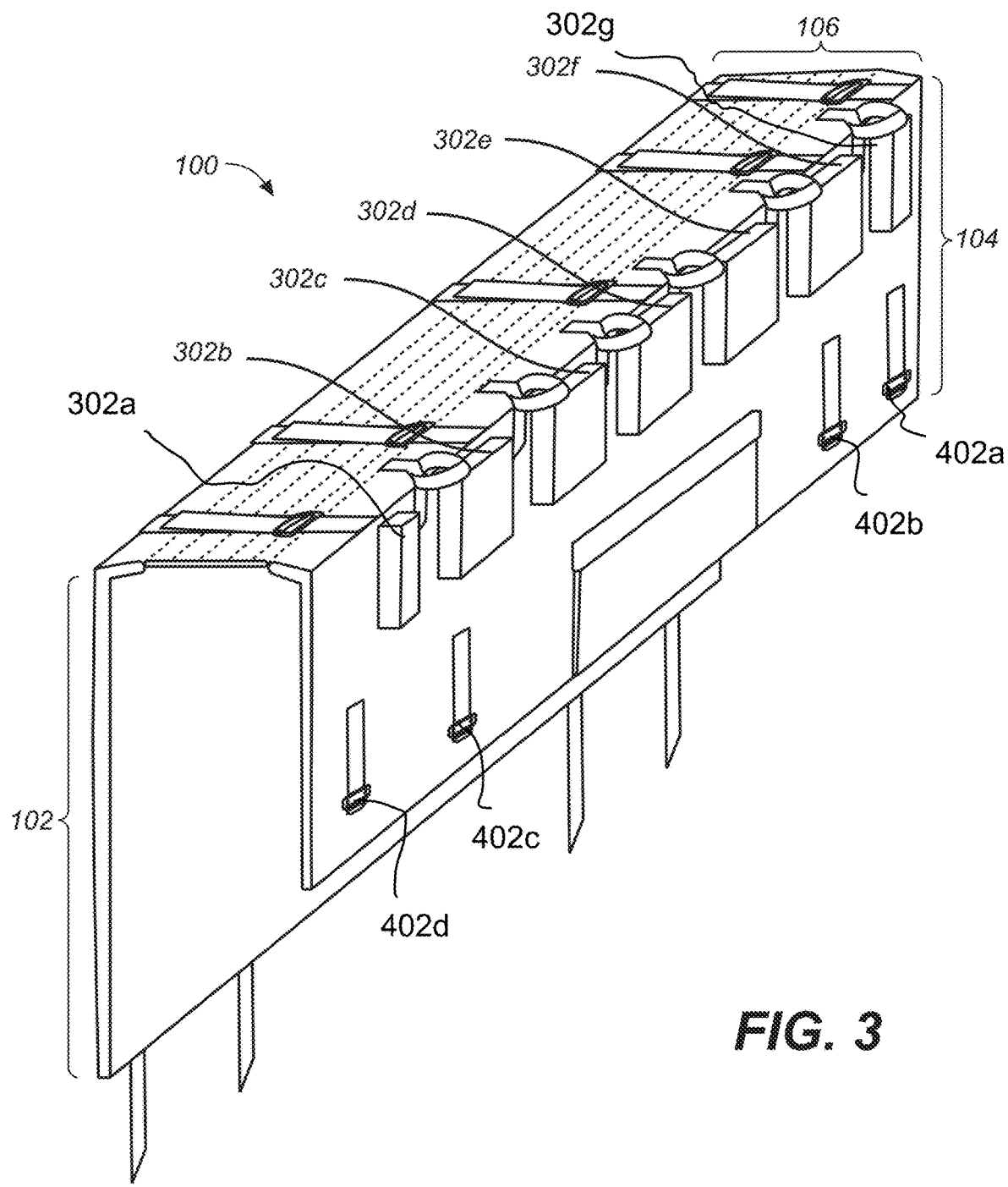
FIG. 3 is a perspective view of an adjustable tailgate pad (facing the back side thereof), in accordance with embodiments of the present invention.

Referring now to FIG. 3, a perspective view of adjustable tailgate pad 100 (facing back side 104) is shown, in accordance with embodiments of the present invention. As shown in FIG. 3, in embodiments of the present invention, adjustable tailgate pad 100 has a plurality of retaining blocks, typically shown as 302a-302g, coupled thereto. In various embodiments of the present invention, retaining blocks 302a-302g are disposed on the exterior-facing surface of back side 104 of adjustable tailgate pad 100. In various embodiments of the present invention, retaining blocks 302a-302g are used to retain and/or support a portion of a bicycle (e.g., by inserting a frame of a bicycle between two adjacent retaining blocks) in a desired position with respect to adjustable tailgate pad 100. In various embodiments of the present invention, retaining blocks 302a-302g of adjustable tailgate pad 100 will retain and/or support a bicycle in an upright position. In various embodiments of the present invention, retaining blocks 302a-302g are used in combination with retaining straps 108a-108f to retain and/or support a bicycle in a desired position with respect to adjustable tailgate pad 100. Additionally, in some embodiments of the present invention, retaining blocks 302a-302g are used without, or in lieu of, retaining straps 108a-108f to retain and/or support a bicycle in a desired position with respect to adjustable tailgate pad 100. Furthermore, in various embodiments of the present invention, at least one of retaining straps 108a-108f includes a first feature (e.g., a hook-and-loop fastener) for removably coupling the retaining strap to adjustable tailgate pad 100 and a second feature (e.g., a hook-and-loop fastener) for coupling the retaining strap to a portion of a bicycle. In so doing, embodiments of the present adjustable tailgate pad 100 enable adjustment of the location at which retaining straps 108a-108f are coupled to adjustable tailgate pad 100. In various other embodiments of the present invention, at least one of retaining straps 108a-108f is permanently affixed to adjustable tailgate pad 100 to prevent loss of the retaining strap.

Referring still to FIG. 3, although seven retaining blocks 302a-302g are shown in the embodiment of FIG. 3, in some embodiments of the present invention, adjustable tailgate pad 100 will have more than seven retaining blocks. Further, in some embodiments of the present invention, adjustable tailgate pad 100 will have less than seven retaining blocks. Additionally, in some embodiments, the location and/or the spacing between the plurality of retaining blocks 302a-302g coupled to adjustable tailgate pad 100 will differ from the location and/or spacing of retaining blocks 302a-302g as depicted in FIG. 1.

Figure 4:
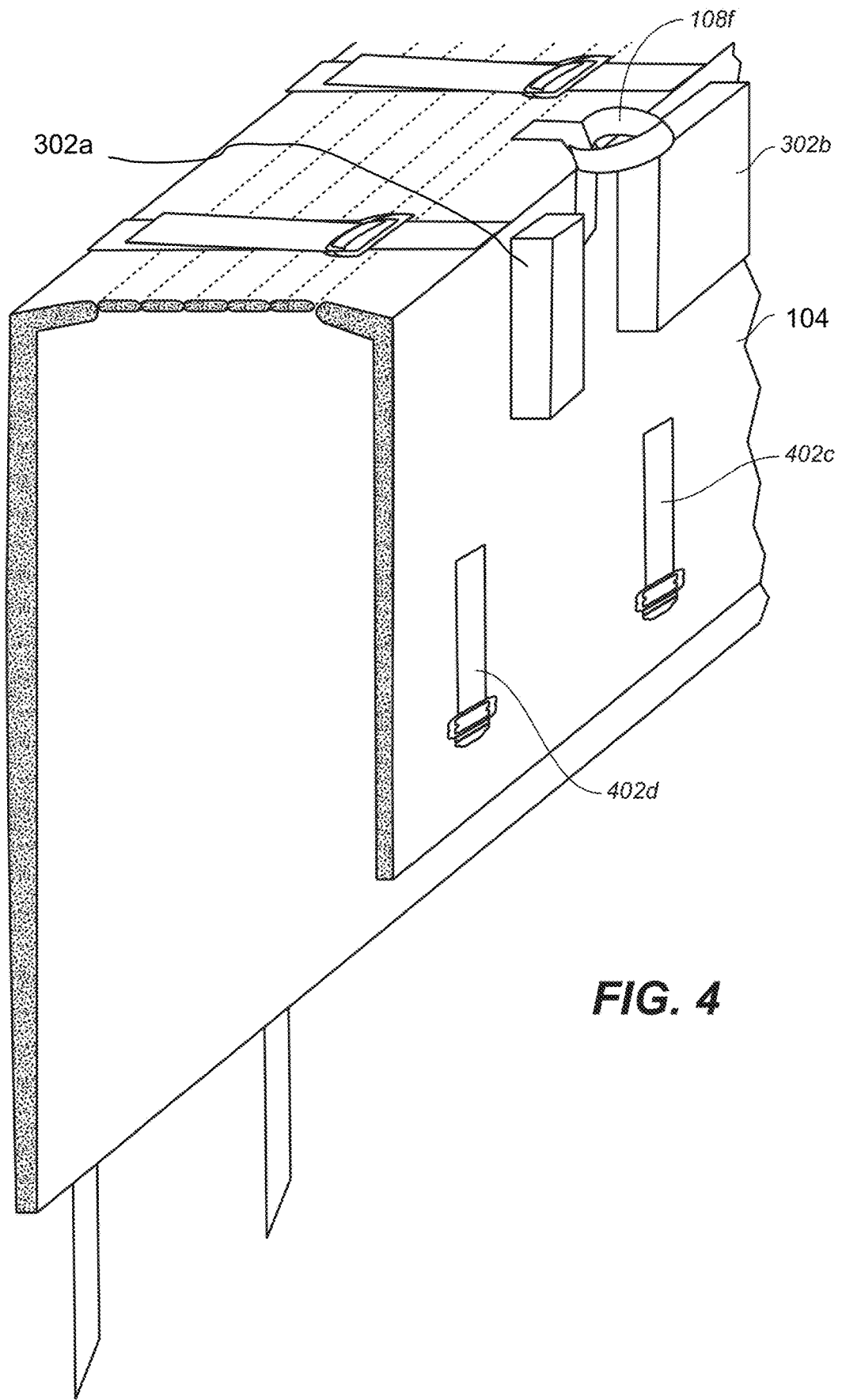
FIG. 4 is an enlarged view of a portion of FIG. 3 depicting various features of an adjustable tailgate pad, in accordance with embodiments of the present invention.

Now referring to FIG. 4, an enlarged view of a portion of FIG. 3 is provided. In FIG. 4, several features of adjustable tailgate pad 100 are further illustrated in detail. Previously described strap receiving features, typically numbered as 402a-402d, are coupled to back side 104, in accordance with embodiments of the present invention. It should be understood that as FIG. 4 depicts an enlarged view of only a portion of FIG. 3, strap receiving features 402c and 402d are shown in FIG. 4, while strap receiving features 402a and 402b are not shown in FIG. 4. Strap receiving feature 402c is positioned to receive front side strap 112c to, and strap receiving feature 402d is positioned to receive front side straps 112d. Referring to the features depicted in FIG. 4, in various embodiments of the present invention, as stated above, strap receiving feature 402c and front side strap 112c are used, together, to secure adjustable tailgate pad 100 to a tailgate. Similarly, strap receiving feature 402d and front side strap 112d are used, together, to secure adjustable tailgate pad 100 to a tailgate. Additionally, although strap receiving features 402a-402d are disposed on the exterior-facing surface of back side 104 in the embodiment depicted in FIG. 4, in various other embodiments of the present invention, strap receiving features 402a-402d are disposed on the tailgate-facing surface of back side 104.

Referring still to FIG. 4, several other features of adjustable tailgate pad 100 are further illustrated in detail. Previously described retaining blocks, typically numbered as 302a-302g, are coupled to back side 104, in accordance with embodiments of the present invention. It should once more be understood that as FIG. 4 depicts an enlarged view of only a portion of FIG. 3, retaining blocks 302a-302b are shown in FIG. 4, while retaining blocks 302c-302g are not shown in FIG. 4. Similarly, retaining strap 108f is shown in FIG. 4, while retaining straps 108a-108e are not shown in FIG. 4. In various embodiments of the present invention, in a manner as was described above, retaining strap 108f and retaining blocks 302a and 302b are used, in combination, to retain and/or support a bicycle in an upright position. In various embodiments of the present invention retaining blocks 302a and 302b are used without, or in lieu of, retaining strap 108f to retain and/or support a bicycle in a desired position with respect to adjustable tailgate pad 100.

With reference still to FIG. 4, in various embodiments, adjustable tailgate pad 100 includes padding or other features, shown as 404 in FIG. 4, disposed between the exterior-facing surface and the tailgate-facing surface of front side 102. Similarly, in various embodiments, adjustable tailgate pad 100 includes padding or other features, disposed between the exterior-facing surface and the tailgate-facing surface of back side 104. Also, in various embodiments, adjustable tailgate pad 100 includes padding or other features, disposed between the exterior-facing surface and the tailgate-facing surface of top side 106. In various embodiments of the present invention, padding or other features may be disposed between the exterior-facing surface and the tailgate-facing surface of each, none or some combination of front side 102, back side 104 and top side 106. In one embodiment of the present adjustable tailgate pad 100, feature 404 is padding. In another embodiment of the present adjustable tailgate pad 100, feature 404 is comprised of multiple layers of padding. In such embodiments, the padding helps to prevent damage to the tailgate and/or the bicycle by enabling adjustable tailgate pad 100 to provide further cushioning between surfaces of the tailgate and the bicycle.

Referring again to FIG. 4, in various embodiments of the present adjustable tailgate pad 100, a lining, shown as 406, is disposed on at least some portion of the tailgate-facing surface of front side 102 and at least some portion of the tailgate-facing surface of back side 104. Also, in various embodiments, adjustable tailgate pad 100 includes a lining disposed on at least some portion of the tailgate-facing surface of top side 106. In various embodiments of the present invention, a lining may be disposed on the tailgate-facing surface of each, none or some combination of front side 102, back side 104 and top side 106. In such embodiments, the lining provides a desired interface between the tailgate and the one or more tailgate-facing surfaces of adjustable tailgate pad 100. In various embodiments, such a lining provides, for example, one or more of a scratch reducing interface, a gripping or adhering interface, a low friction interface, etc., between the tailgate and the one or more tailgate-facing surfaces of adjustable tailgate pad 100. Further, in various embodiments, lining 406 provides cushioning between adjustable tailgate pad 100 and the tailgate to further prevent damage to the tailgate and/or the bicycle by, for example, enhancing cushioning between surfaces of the tailgate and adjustable tailgate pad 100 and/or between the tailgate and a bicycle.

Further, in various embodiments of the present invention, a lining is disposed on the exterior-facing surface of each, none or some combination of front side 102, back side 104 and top side 106. In such embodiments, the lining provides a desired interface between adjustable tailgate pad 100 and a bicycle. In various embodiments, such a lining provides, for example, one or more of a scratch reducing interface, a gripping or adhering interface, a low friction interface, etc., between adjustable tailgate pad 100 and the surface of a bicycle. Further, in various embodiments, lining 406 provides cushioning between adjustable tailgate pad 100 and a bicycle to further prevent damage to the bicycle by, for example, enhancing cushioning between surfaces of adjustable tailgate pad 100 and a bicycle, and/or between the tailgate and the bicycle.

In one embodiment of the present adjustable tailgate pad 100, feature 104 is comprised of padding. In another embodiment of the present adjustable tailgate pad 100, feature 104 is comprised of multiple layers of padding. In such embodiments, the padding helps to prevent damage to the tailgate and/or the bicycle by configuring adjustable tailgate pad 100 to provide further cushioning between surfaces of the tailgate and the bicycle.

Referring again to FIG. 4, in various embodiments of the present adjustable tailgate pad 100, previously described plurality of top side straps (shown as 107a-107e in FIGS. 1-3) are coupled to top side 106. Once again, it should be understood that as FIG. 4 depicts an enlarged view of only a portion of FIG. 3, top side straps 107d-107e are shown in FIG. 4, while top side straps 107d-107e (of, e.g., FIG. 1) are not shown in FIG. 4.

With reference still to FIG. 4, in embodiments of the present adjustable tailgate pad 100, top side straps 107d-107e (and top side straps 107a-107c) are used to adjust the width of top side 106. For purposes of the present discussion, the width of top side 106 refers to the distance, along top side 106, between front side 102 and back side 104. Additionally, for purposes of the present discussion, the length of top side 106 refers to the distance from an edge of adjustable tailgate pad 100 nearest, for example, retaining strap 108a to an opposite edge of adjustable tailgate pad 100 nearest, for example, retaining strap 108f. As will be discussed below, in embodiments of the present invention, the width of top side 106 will vary across the length of adjustable tailgate pad 100. Thus, in embodiments of the present invention, the width of top side 106 will vary from an edge of adjustable tailgate pad 100 nearest, for example, retaining strap 108a to an opposite edge of adjustable tailgate pad 100 nearest, for example, retaining strap 108f.

Additionally, although top side straps 107a-107e are disposed on the exterior-facing surface of top side 106 in the embodiment depicted in FIG. 4, in various other embodiments of the present invention, top side straps 107a-107e are disposed on the tailgate-facing surface of top side 106. In various embodiments of the present invention, top side straps are used to, for example, provide a cinching of top side 106 and, thereby, reduce the width of top side 106.

FIGS. 5A, 5B and 5C provide a schematic representation of a tailgate 502 and adjustable tailgate pad 100 wherein the width of top side 106 is adjusted to fit the width of tailgate 502. As shown in FIG. 5A, a schematic side view of a portion of tailgate 502 is shown. Tailgate 502 is shown to have a width, W. In FIG. 5B, a schematic side view of adjustable tailgate pad 100 is shown with adjustable tailgate pad disposed over tailgate 502. As depicted in FIG. 5B, top side 106 has an initial width which exceeds the width, W, of tailgate 502. More specifically, in FIG. 5B, the initial width of top side 106 exceeds the width, W, of tailgate 502 such that front side 102 is spaced from tailgate 502 by a distance di. Also, in FIG. 5B, the initial width of top side 106 exceeds the width, W, of tailgate 502 such that back side 104 is spaced from tailgate 502 by a distance dz. At FIG. 5C, in accordance with embodiments of the present invention, the width of top side 106 is adjusted to fit the width, W, of tailgate 502. In one embodiment, the width of top side 106 is adjusted by using top side straps 107a-107e to cinch top side 106 and, thereby, reduce the width of top side 106 until the width of top side 106 fits the width, W, of tailgate 502. That is, the width of top side 106 is reduced (by cinching top side straps 107a-107e) until the distance di between front side 102 and tailgate 502 is sufficiently reduced (or entirely eliminated), and/or the distance da between back side 104 and tailgate 502 is sufficiently reduced (or entirely eliminated), to achieve a desired fit of adjustable tailgate pad 100 about tailgate 502.

Although FIGS. 5A-5C schematically illustrate an embodiment in which the initial width of top side 106 is reduced to fit the width of tailgate 502, embodiments of the present invention are also well suited to increasing the initial width of top side 106 to fit a particular tailgate. In one such embodiment, the width of top side 106 is adjusted/increased by loosening top side straps 107a-107e to allow top side 106 to expand and, thereby, increase the width of top side 106 until the width of top side 106 fits the width of the particular tailgate. That is, the width of top side 106 is increased (by, e.g., loosening top side straps 107a-107e) until front side 102 and back side 104 of adjustable tailgate pad 100 achieve a desired fit about the tailgate.

Figure 6:
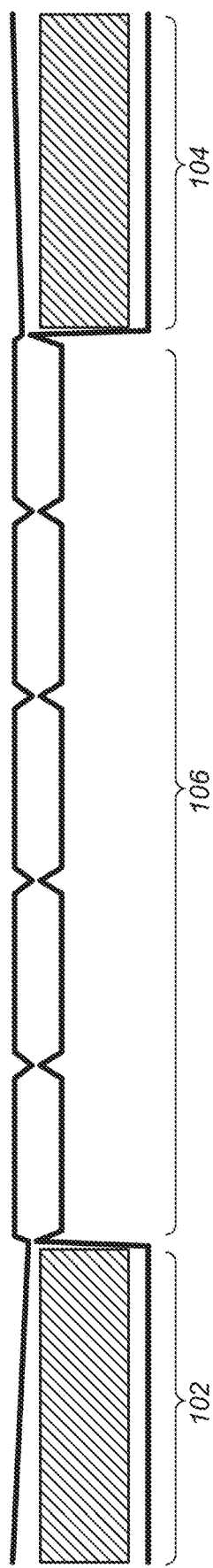
FIG. 6 is a schematic depiction of an embodiment of a structure of a top side of an adjustable tailgate pad, in accordance with embodiments of the present invention.

With reference now to FIG. 6, a schematic depiction of an embodiment of a structure of top side 106 is shown. In the embodiment of FIG. 6, top side 106 is comprised of a structure and/or a material which is capable of be compressed or expanded. Such structures and/or materials include, but are not limited to stretchable fabrics, resilient foams, honeycombed structure, elastic materials, etc.

In various embodiments of the present invention, top side 106 is comprised of a material having sufficient elasticity such that top side 106 has an "unstretched' or "relaxed" initial width which is less than the width of most tailgates. In such an embodiment, the width of top side 106 is stretched (by, e.g., sliding adjustable tailgate pad 100 over a tailgate) until front side 102 and back side 104 of adjustable tailgate pad 100 achieve a desired fit about the tailgate.

Figure 7A:
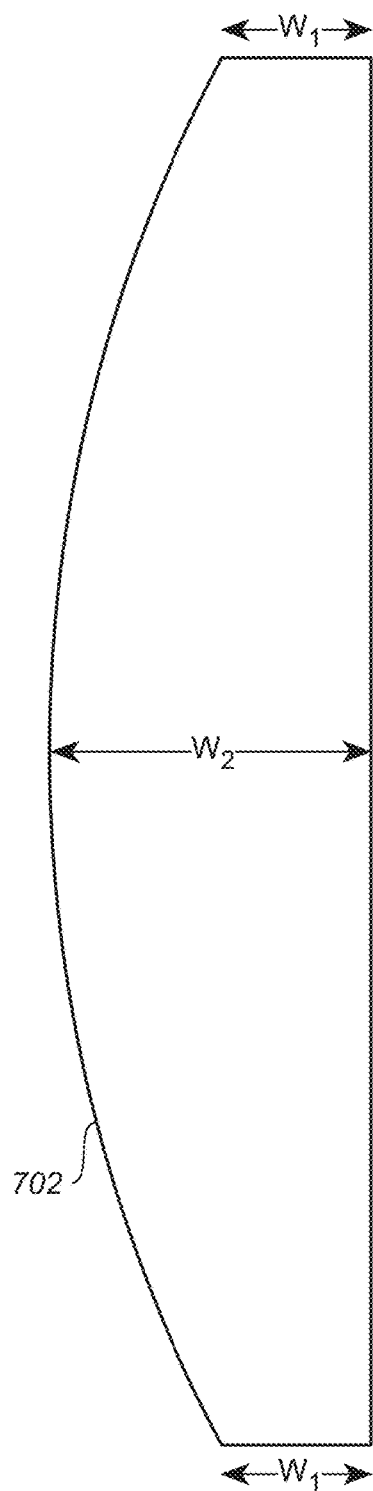
FIGS. 7A and 7B are top schematic views of a tailgate having a varying width and an adjustable tailgate pad coupled thereto, in accordance with embodiments of the present invention.
Figure 7B:
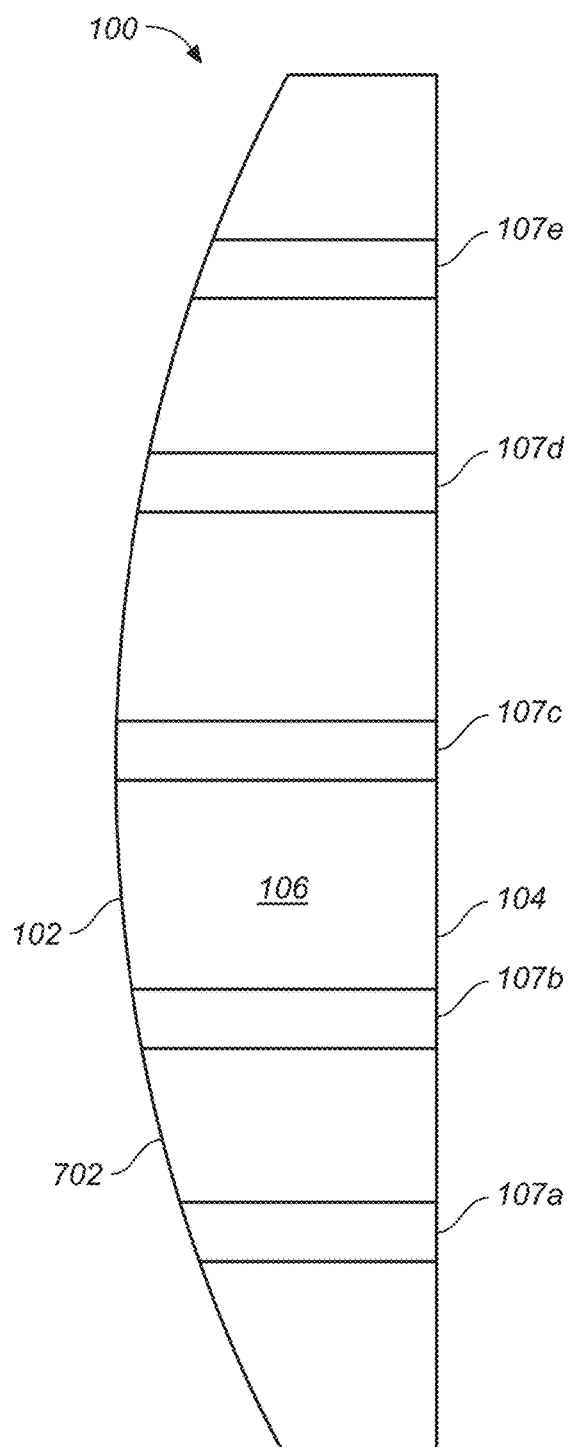

With reference now to FIGS. 7A and 7B a top schematic view of a tailgate 702 is shown. As depicted in FIG. 7A, tailgate 702 has a varying width across its length. Specifically, tailgate 702 has a width, $W_1$ at its edges, and a width, $W_2$, at or near the midpoint of its length. In various commercially available vehicles, tailgate widths vary by several inches along the length of the tailgate. That is, various commercially available vehicles have a width at the edge of the tailgate which is several inches shorter than the width at the midpoint of the length of the tailgate.

At FIG. 7B, in accordance with embodiments of the present invention, the width of top side 106 of adjustable tailgate pad 100 is adjusted to fit the varying width of tailgate 702 (i.e., from width, $W_1$ at a first edge of tailgate 702 to width, $W_2$ at the midpoint of the length of tailgate 702, and back to $W_1$, at the second edge of tailgate 702). In one embodiment, the width of top side 106 is adjusted to have a width, at or near, width W1, by using top side strap 107a to adjust the width of top side 106 until the width of top side 106 fits, at least approximately, the width, $W_1$, of tailgate 702. Additionally, in the embodiment of FIG. 7B, the width of top side 106 is adjusted to have a width which is between width $W_1$ and width $W_2$, of tailgate 702 by using top side strap 107b to adjust the width of top side 106 to the desired width.

Referring still to FIG. 7B, in the present embodiment, the width of top side 106 is adjusted to have a width, at or near, width $W_2$, by using top side strap 107c to adjust the width of top side 106 until the width of top side 106 fits, at least approximately, the width, $W_2$, of tailgate 702. Additionally, in the embodiment of FIG. 7B, the width of top side 106 is adjusted to have a width which is between width $W_1$ and width $W_2$, of tailgate 702 by using top side strap 107d to adjust the width of top side 106 to the desired width. The present embodiment further adjusts the width of top side 106 to a width, at or near, width W1, by using top side strap 107e to adjust the width of top side 106 until the width of top side 106 fits, at least approximately, the width, $W_1$, of tailgate 702. Thus, the present adjustable tailgate pad 100 is able to accommodate even a tailgate whose width varies along its length. Furthermore, the various embodiments of the present adjustable tailgate pad are able to fit about a tailgate without creating unsightly bunching or bulging of either front side 102 or back side 104. As a result, the present adjustable tailgate pad 100 is eliminates bunching and bulging of tailgate pad surfaces found in conventional ill-fitting tailgate pads. Further, by eliminating such bulging and bunching, embodiments of the present adjustable tailgate pad 100 prevent unwanted exposure of portions of the underlying tailgate. By eliminating such unwanted exposure of the tailgate, the present adjustable tailgate pad 100 also prevents unwanted scratching and/or damage to the tailgate or bicycle which can occur at the exposed portions of the tailgate.

In embodiments of the present adjustable tailgate pad 100, by adjusting the width of top surface 106, as described above, adjustable tailgate pad 100 is able to achieve a proper fit about various tailgates of different, respective, widths. As a result, a single version of the present adjustable tailgate pad 100 can be used with numerous tailgates each having a different, respective width. As a result, embodiments of the present adjustable tailgate pad 100 eliminate the requirement for a consumer to select the specific tailgate pad which is uniquely designed to match the particular tailgate width for that consumer's vehicle. Further, by providing an adjustable tailgate pad 100 which can accommodate numerous tailgate dimension and/or shapes, embodiments of the present invention reduce consumer confusion, eliminate the need for complex vehicle-to-tailgate pad matching charts, and remove the need for each tailgate to have a dedicated corresponding tailgate pad design.

Figure 8A:
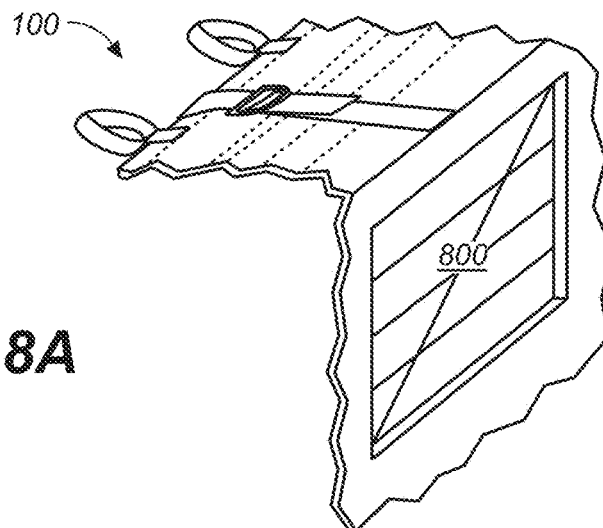
FIGS. 8A, 8B and 8C are several front perspective views of an adjustable window cover in various position with respect to a window of an adjustable tailgate pad, in accordance with embodiments of the present invention.
Figure 8B:
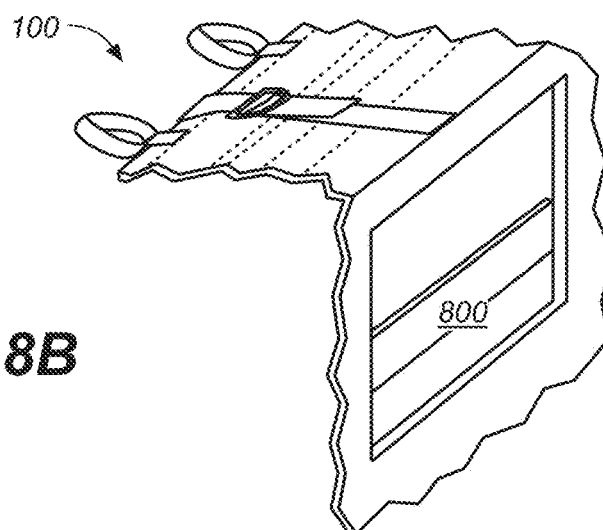
Figure 8C:
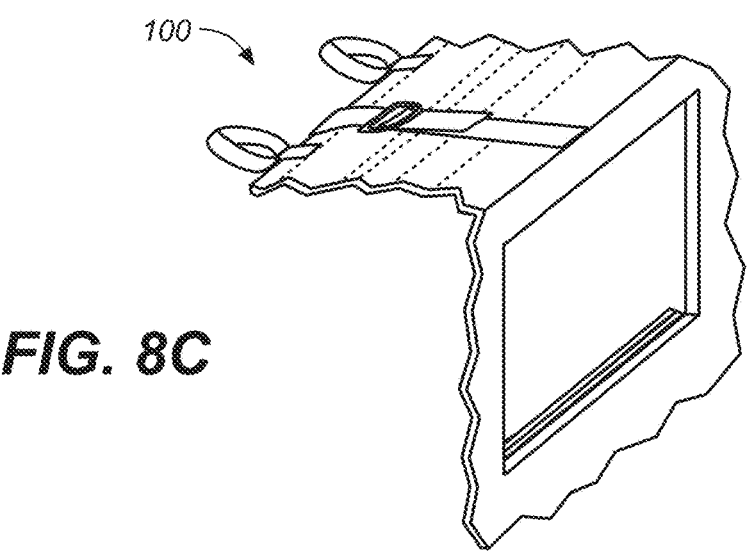

With now to FIGS. 8A, 8B and 8C, several front perspective views of an adjustable window cover 800 in various position with respect to window 110 of adjustable tailgate pad 100 is shown. In FIG. 8A, adjustable window cover 800 is shown extending across the entirety of window 110. In FIG. 8B, adjustable window cover 800 is shown partially extending across window 110. In FIG. 8C, adjustable window cover 800 is shown completely extending across window 110. As stated above, in various embodiments of the present adjustable tailgate pad 100, front side 102 has a window 110 formed therein. When window 110 of front side 102 is open (as depicted in FIG. 8A and FIG. 8B), window 110 will expose, for example, a tailgate handle, a tailgate-mounted backup camera, a retractable step, or other tailgate features.

In various embodiments of the present adjustable tailgate pad 100, adjustable window cover 800 is removably coupleable (e.g., using a hook-and-loop fastener) to adjustable tailgate pad 100 at a location near any one or more of the bottom, top, right side, or left side of window 110. Further, in various embodiments of the present adjustable tailgate pad 100, at least some portion of adjustable window cover 800 is permanently affixed to adjustable tailgate pad 100, while another portion of adjustable window cover 800 is removably coupleable to some portion of adjustable tailgate pad 100. Additionally, although adjustable window cover 800 is shown coupled to the tailgate-facing surface of front side 102 of adjustable tailgate pad 100 in FIGS. 8A-8C, in various other embodiments of the present adjustable tailgate pad 100, window cover 800 is coupled (permanently and/or removably) to the exterior-facing surface of front side 102 of adjustable tailgate pad 100.

Figure 9A:
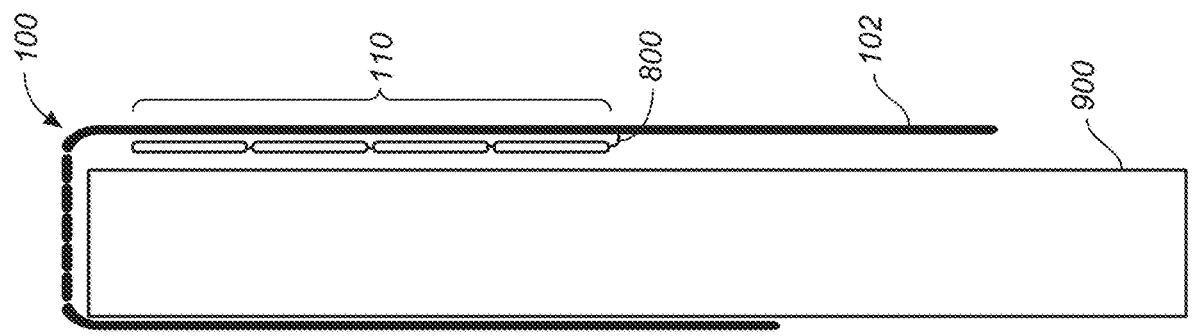
FIGS. 9A, 9B and 9C are schematic side views corresponding to FIGS. 8A, 8B and 8C, respectively, of an adjustable window cover in various position with respect to a window of an adjustable tailgate pad, in accordance with embodiments of the present invention.
Figure 9B:
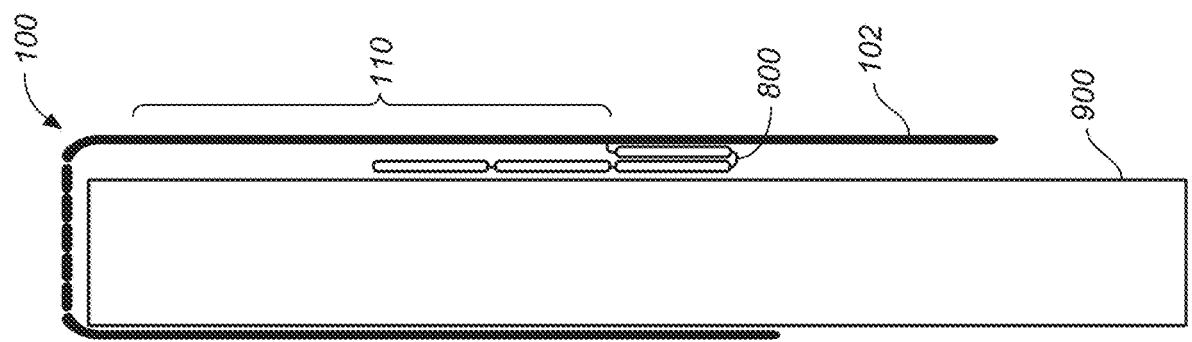
Figure 9C:
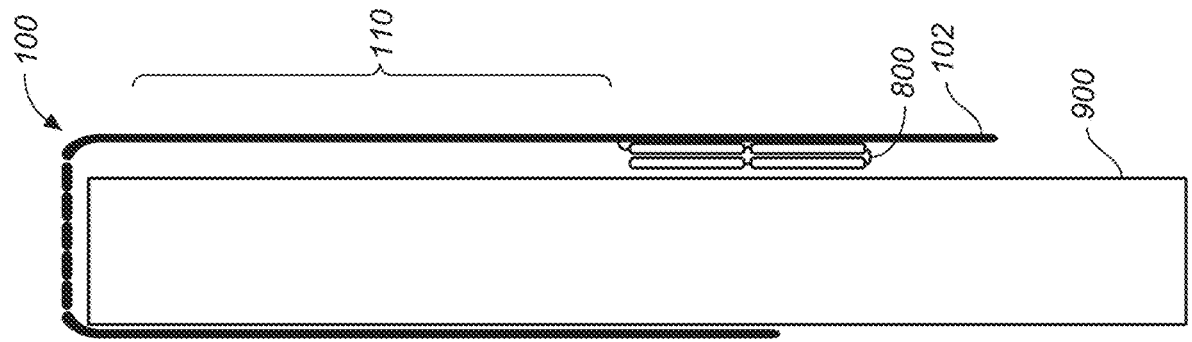

Referring now to FIGS. 9A-9C, schematic side views corresponding to FIGS. 8A-8C, respectively, are provided. As depicted in FIGS. 9A-9C, in various embodiments of the present adjustable tailgate pad 100, adjustable window cover 800 has an accordion-style structure such that at least a portion of adjustable window cover 800 is foldable into a stacked configuration. In so doing, adjustable window cover 800 can be partially or entirely disposed across window 100 to selectively expose a desired region of tailgate 900. Such selective exposure of a portion of tailgate 900 enables embodiments of the present adjustable tailgate pad 100 to have desired features of tailgate 900 exposed through window 110. Additionally, the accordion style structure of adjustable window cover 800 enables folded portions of adjustable window cover 800 to be compactly stored with respect to front side 102 of adjustable tailgate pad 100. Further, in one embodiment, adjustable window cover 800 is compactly stored between tailgate 900 front side 102 of adjustable tailgate pad 100. As a result, the present adjustable tailgate pad 100 is eliminates bunching and bulging of tailgate pad surfaces at or near window openings of conventional tailgate pads. Further, by eliminating such bulging and bunching near window openings, embodiments of the present adjustable tailgate pad 100 prevent unwanted exposure of portions of the underlying tailgate. By eliminating such unwanted exposure of the tailgate, the present adjustable tailgate pad 100 also prevents unwanted scratching and/or damage to the tailgate or bicycle which can occur at the exposed portions of the tailgate at or near window opening.

Figure 10:
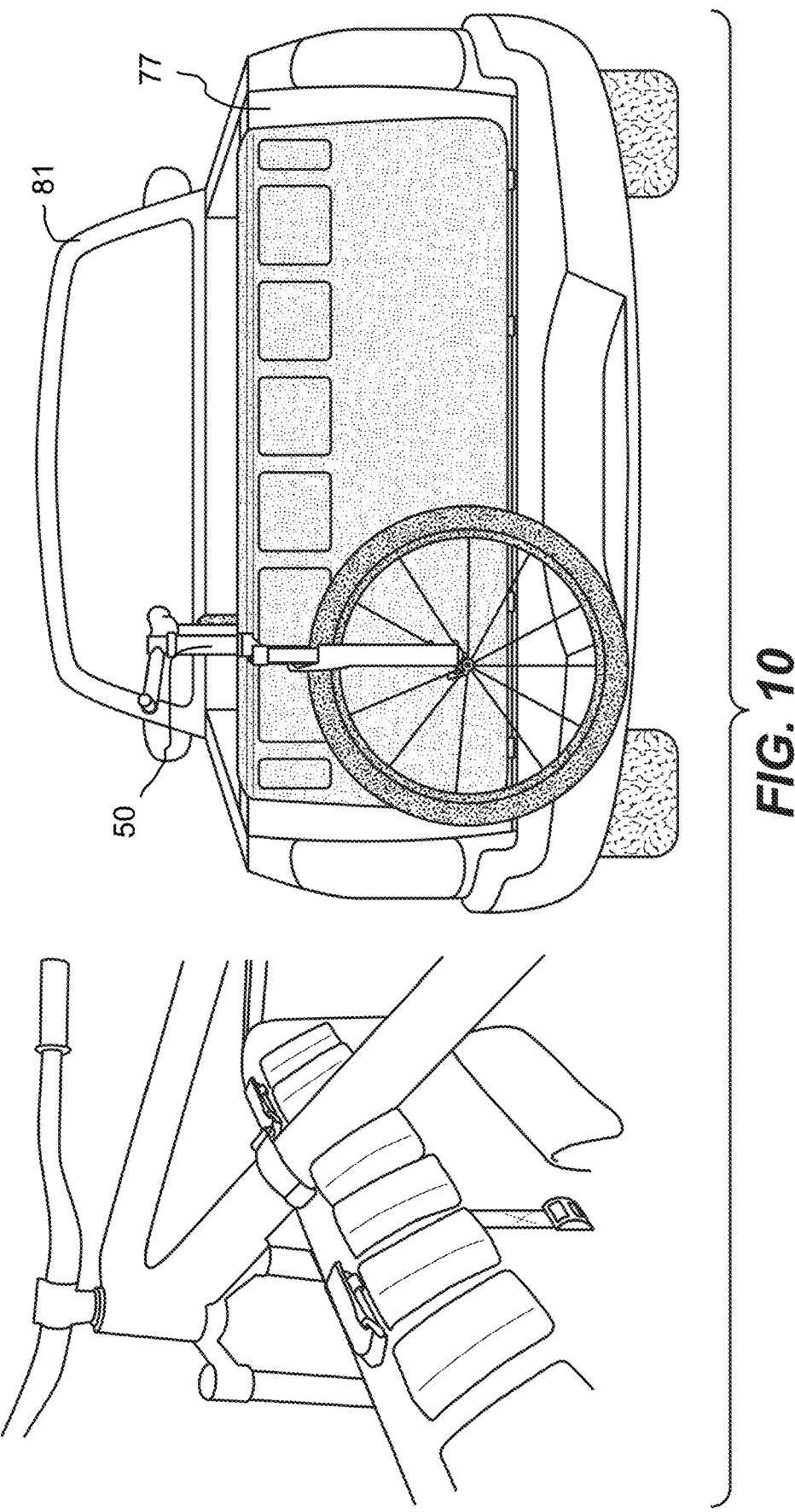
FIG. 10 is a perspective view of a tailgate pad disposed about a tailgate and a bicycle disposed about the tailgate pad, in accordance with embodiments of the present invention.

FIG. 10 is a perspective view of a tailgate pad disposed about a tailgate 77 and a bicycle 50 disposed about the adjustable tailgate pad 100.

A Tailgate Pad with Fold Out Panel

In the following discussion, a tonneau is an area of a vehicle (such as a car, truck, side-by-side, etc.) the is open at the top. In general, a tonneau can be used for cargo or passengers. A simple example of a tonneau is a bed of a truck, such as a pick-up truck. Although a pick-up truck is disclosed, a tonneau is also found in other vehicles to include a Ute, e.g., a vehicle built on passenger car chassis and with the tonneau integrated with the passenger body. Another example of a vehicle with a tonneau is a side-byside (golf-cart, maintenance vehicle, etc.) that has a somewhat open seating area at the front and then the tonneau area there behind.

In one embodiment, the tonneau is enclosed on three sides by fixed structures and the fourth side is enclosed with a movable structure. For example, in a pick-up truck, a front structure encloses the front of the tonneau located by the cab of the truck and the two sidewalls are fixedly coupled with the front enclosure. A moveable tailgate is coupled with the two sidewalls and is used to provide access to the tonneau and also act as a fourth sidewall to keep any contents placed within the tonneau from falling out of the tonneau. The tailgate is usually attached at the bottom of the sidewalls by a hinge (or the like) and when open lays flat to act as an access point and also as an extension to the cargo area of the tonneau. When closed, the tailgate is usually lifted up e.g., rotated about the hinge, till it reaches an engagement or latch portion of the sidewall. Once the tailgate is latched to the sidewalls, it is held in an upright closed position forming the fourth wall about the tonneau. Normally, there is a handle or the like that is used to disengage the latch and allow the tailgate to be rotated back downward to an open position.

Although a number of different tonneau configured vehicles have been disclosed, for purposes of brevity and clarity, the tonneau will be referred to hereinafter as a "truck bed". Moreover, for purposes of clarity, the tailgate-equipped truck bed will refer to the tailgate 77 of a pick-up truck 81 as shown in FIG. 10.

As described herein, in some instances, owners of tailgate-equipped vehicles may utilize the tailgate when transporting, for example, a bicycle 50. However, embodiments of the present adjustable partial tailgate pad 150 are well suited to use with other items such as, for example, a surfboard, a paddleboard, lumber or other items which may be transported in the bed of a truck and may rest partially on the tailgate thereof. That said, for purposes of brevity and clarity, and not to be interpreted as a limitation, the following discussion will describe embodiments of the present invention while referring to a truck tailgate being used to support a bicycle.

Figure 11:
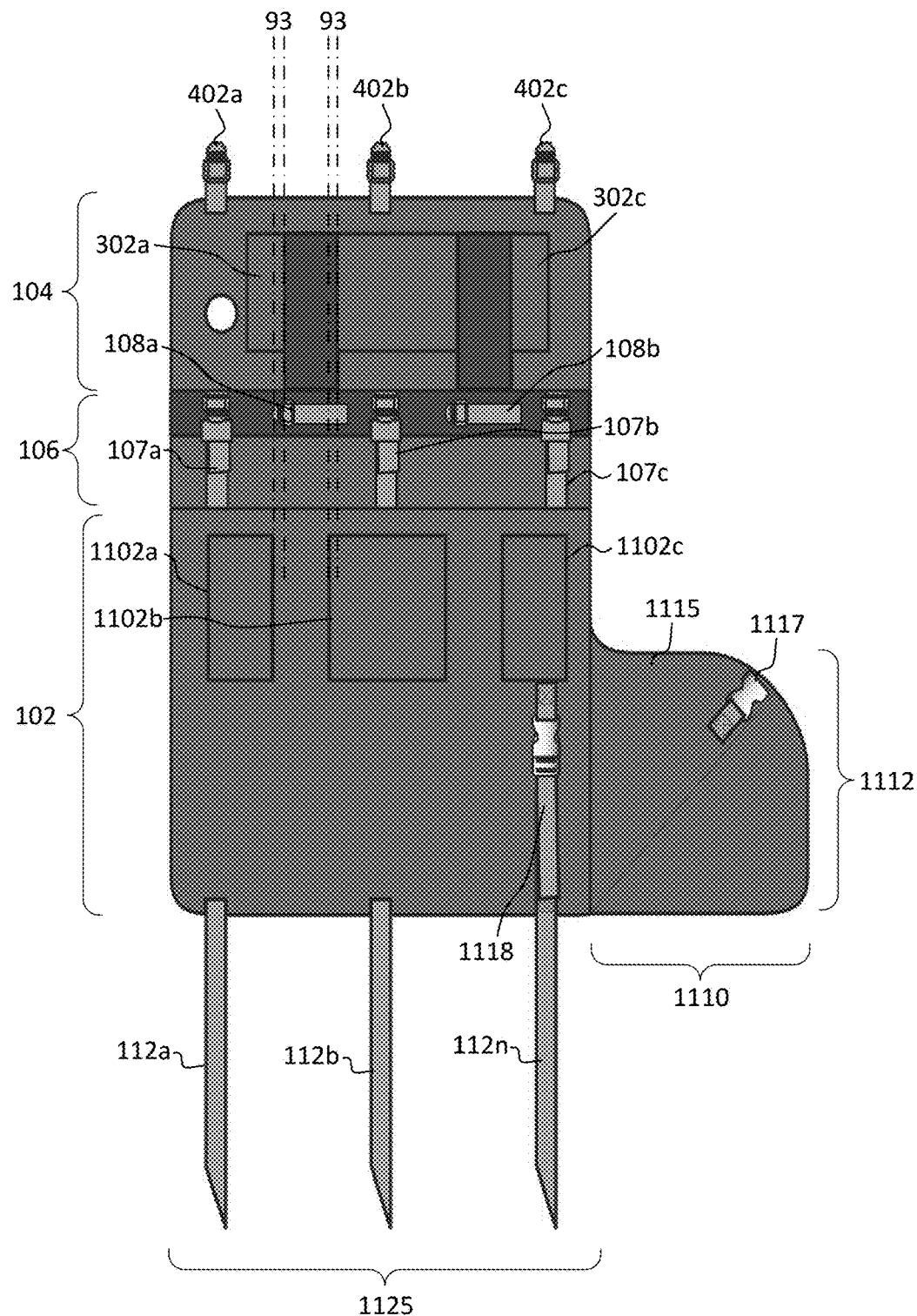
FIG. 11 is a top view of an adjustable partial tailgate pad, in accordance with one embodiment.

With reference now to FIG. 11, a top view of an adjustable partial tailgate pad 150 is shown in accordance with one embodiment of the present invention. In one embodiment, adjustable partial tailgate pad 150 is similar in form and function to the adjustable tailgate pad 100 described herein. For purposes of clarity, the description of components that have been previously described is not repeated however, their descriptions are incorporated by reference in their entirety.

In one embodiment, adjustable partial tailgate pad 150 has a length 1125. In one embodiment, length 1125 is just less than half the length of tailgate 77. In one embodiment, length 1125 is a third of the length of tailgate 77. In one embodiment, length 1125 is a quarter of the length of tailgate 77. In one embodiment, length 1125 is two-thirds of the length of tailgate 77. In one embodiment, length 1125 is three-quarters of the length of tailgate 77. In one embodiment, length 1125 is a customizable length that is less than the overall length of tailgate 77.

In one embodiment, adjustable partial tailgate pad 150 of the present invention includes front side 102, back side 104 and top side 106 similar to those features previously described. However, unlike adjustable tailgate pad 100 which covers most or all of a tailgate such as tailgate 77 of FIG. 10, adjustable partial tailgate pad 150 is meant to cover less than all of tailgate 77 for times when only one or a few bicycles are being hauled and the adjustable partial tailgate pad 150 will prevent unwanted scratching and/or damage to the portion of the tailgate 77 about which bicycle 50 is stowed.

In one embodiment, each of front side 102, a back side 104 and a top side 106 of adjustable partial tailgate pad 150 are comprised of a tailgate-facing surface and an exterior-facing surface. For purposes of brevity and clarity, and not to be interpreted as a limitation, the following discussion will describe embodiments of the present invention while generally referring to front side 102, a back side 104 and a top side 106.

In one embodiment, at least a portion of one, each or every tailgate-facing surface of front side 102, back side 104, and top side 106 of adjustable partial tailgate pad 150 are comprised of a paint protecting material to protect the painted surface of tailgate 77. In one embodiment, the paint protecting material on the inner or tailgate-facing surface is a material such as, but not limited to, a fleece lining, microfiber lining, flannel lining, a synthetic and/or natural textile lining, a non-woven textile, polymer foams, and the like.

In one embodiment, only a tailgate-facing surface of front side 102, back side 104, and top side 106 of adjustable partial tailgate pad 150 that is abutted against a painted surface of tailgate 77 is comprised of a soft material that is configured so as to not damage the tailgate surface and to the painted surface of tailgate 77. In one embodiment, at least a portion of the other tailgate-facing surfaces of adjustable partial tailgate pad 150 that are not abutted against a painted surface of tailgate 77 (e.g., such as the top and the interior of tailgate 77 one or both of which may include a hard protective cover or be coated with a protective material such as a spray on bed liner) are comprised of a more durable material such as nylon, polyamide (PA), rayon (e.g., Cordura), denim, a stretched polytetrafluoroethylene (PTFE) (e.g., Gor-Tex), an aramid (e.g., Kevlar, Nomex, Technora, and the like), a thermoplastic polymer, polyester, polyvinyl chloride (PVC), silicone, and the like.

In one embodiment, one, each or every exterior-facing surface of front side 102, back side 104, and top side 106 of adjustable partial tailgate pad 150 are comprised of a durable material such as nylon, polyamide (PA), rayon (e.g., Cordura), denim, a stretched polytetrafluoroethylene (PTFE) (e.g., Gor-Tex), an aramid (e.g., Kevlar, Nomex, Technora, and the like), a thermoplastic polymer, and the like.

In one embodiment, top side 106 of adjustable partial tailgate pad 150 has a plurality of top side straps shown as 107a-107c, coupled thereto. Although three top side straps 107a-107c are shown, in some embodiments, adjustable partial tailgate pad 150 will have more than three top side straps. Further, in some embodiments, adjustable partial tailgate pad 150 will have less than three top side straps. Additionally, in some embodiments, the location and/or the spacing between the plurality of top side straps 107a-107c coupled to top side 106 will differ from the location and/or spacing of top side straps 107a-107c as depicted in FIG. 11.

In one embodiment, adjustable partial tailgate pad 150 has a plurality of retaining straps, typically shown as 108a and 108b, coupled thereto. In various embodiments of the present invention, retaining straps 108a and 108b are used to strap a portion of bicycle 50 (e.g., a frame of a bicycle) against back surface 104 of adjustable partial tailgate pad 150. Although two retaining straps 108a and 108b are shown in the embodiment of FIG. 11, in some embodiments, adjustable partial tailgate pad 150 will have more than two retaining straps. Further, in some embodiments, adjustable partial tailgate pad 150 will have less than two retaining straps. Additionally, in some embodiments, the location and/or the spacing between the plurality of retaining straps 108a and 108b coupled to adjustable partial tailgate pad 150 will differ from the location and/or spacing of retaining straps 108a and 108b as depicted in FIG. 11.

In one embodiment, at least one of retaining straps 108a and 108b include a first feature (e.g., a hook-and-loop fastener) for removably coupling the retaining strap to adjustable partial tailgate pad 150 and a second feature (e.g., a hook-and-loop fastener) for coupling the retaining strap to a portion of bicycle 50. In so doing, embodiments of the present adjustable partial tailgate pad 150 enable adjustment of the location at which retaining straps 108a and 108b are coupled to adjustable partial tailgate pad 150. In various other embodiments, at least one of retaining straps 108a and 108b is permanently affixed to adjustable partial tailgate pad 150 to prevent loss of the retaining strap.

In one embodiment, front side 102 of adjustable partial tailgate pad 150 includes a plurality of front side straps, typically shown as 112a-112n, coupled thereto. Although three front side straps 112a-112n are shown in the embodiment of FIG. 11, in some embodiments, adjustable partial tailgate pad 150 will have more than three front side straps. Further, in some embodiments, adjustable partial tailgate pad 150 will have less than three front side straps. Additionally, in some embodiments, the location and/or the spacing between the plurality of front side straps 112a-112n coupled to front side 102 will differ from the location and/or spacing of front side straps 112a-112n as depicted in FIG. 11.

In one embodiment, back side 104 of adjustable partial tailgate pad 150 includes a plurality of front strap receivers, typically shown as 402a-402c, coupled thereto. Examples of an embodiment of a front strap receiver include, but is not limited, a cinch ring, a back side strap, a portion of a hook-and-loop fastener to mate with corresponding portion of a hook-and-loop fastener on a front side strap, etc.

In one embodiment, the number of front strap receivers 402a-402c is related to the number of front side straps 112a-112n. Thus, in one embodiment, if adjustable partial tailgate pad 150 has more than three front side straps it will also have more than three front strap receivers on back side 104. Similarly, if adjustable partial tailgate pad 150 has less than three front side straps it will also have less than three front strap receivers on back side 104. Additionally, in some embodiments, the location and/or the spacing between the plurality of front strap receivers 402a-402c coupled to back side 104 will differ from the location and/or spacing of front strap receivers 402a-402c as depicted in FIG. 11.

As described previously herein, in various embodiments, front side straps 112a-112n are used to secure adjustable partial tailgate pad 150 to a portion of tailgate 77. In one embodiment, the front side straps 112a-112n are placed under the bottom portion of tailgate 77 and are then coupled with front strap receivers 402a-402c, located on back side 104 of adjustable partial tailgate pad 150. In so doing, front side straps 112a-112n are used to secure adjustable partial tailgate pad 150 to a portion of tailgate 77.

Referring still to FIG. 11, in one embodiment, back side 104 of adjustable partial tailgate pad 150 has a plurality of retaining blocks, typically shown as 302a-302c, coupled thereto. In various embodiments, retaining blocks 302a-302c are disposed on the exterior-facing surface of back side 104 of adjustable partial tailgate pad 150. In one embodiment, retaining blocks 302a-302c are used to retain and/or support a portion of bicycle 50 (e.g., by inserting a frame of a bicycle between two adjacent retaining blocks) in a predefined position with respect to adjustable partial tailgate pad 150. In one embodiment, retaining blocks 302a-302c of adjustable partial tailgate pad 150 will retain and/or support bicycle 50 in an upright position.

In one embodiment, retaining blocks 302a-302c are used in combination with retaining straps 108a and 108b to retain and/or support bicycle 50 in a desired position with respect to adjustable partial tailgate pad 150. Additionally, in some embodiments of the present invention, retaining blocks 302a-302c are used without, or in lieu of, retaining straps 108a and 108b to retain and/or support bicycle 50 in a desired position with respect to adjustable partial tailgate pad 150.

Although three retaining blocks 302a-302c are shown in one embodiment, in various embodiments, adjustable partial tailgate pad 150 will have more than three retaining blocks. Further, in some embodiments, adjustable partial tailgate pad 150 will have less than three retaining blocks. Additionally, in some embodiments, the location and/or the spacing between the plurality of retaining blocks 302a-302c coupled to adjustable partial tailgate pad 150 will differ from the location and/or spacing of retaining blocks 302a-302c as depicted in FIG. 11.

Figure 14:
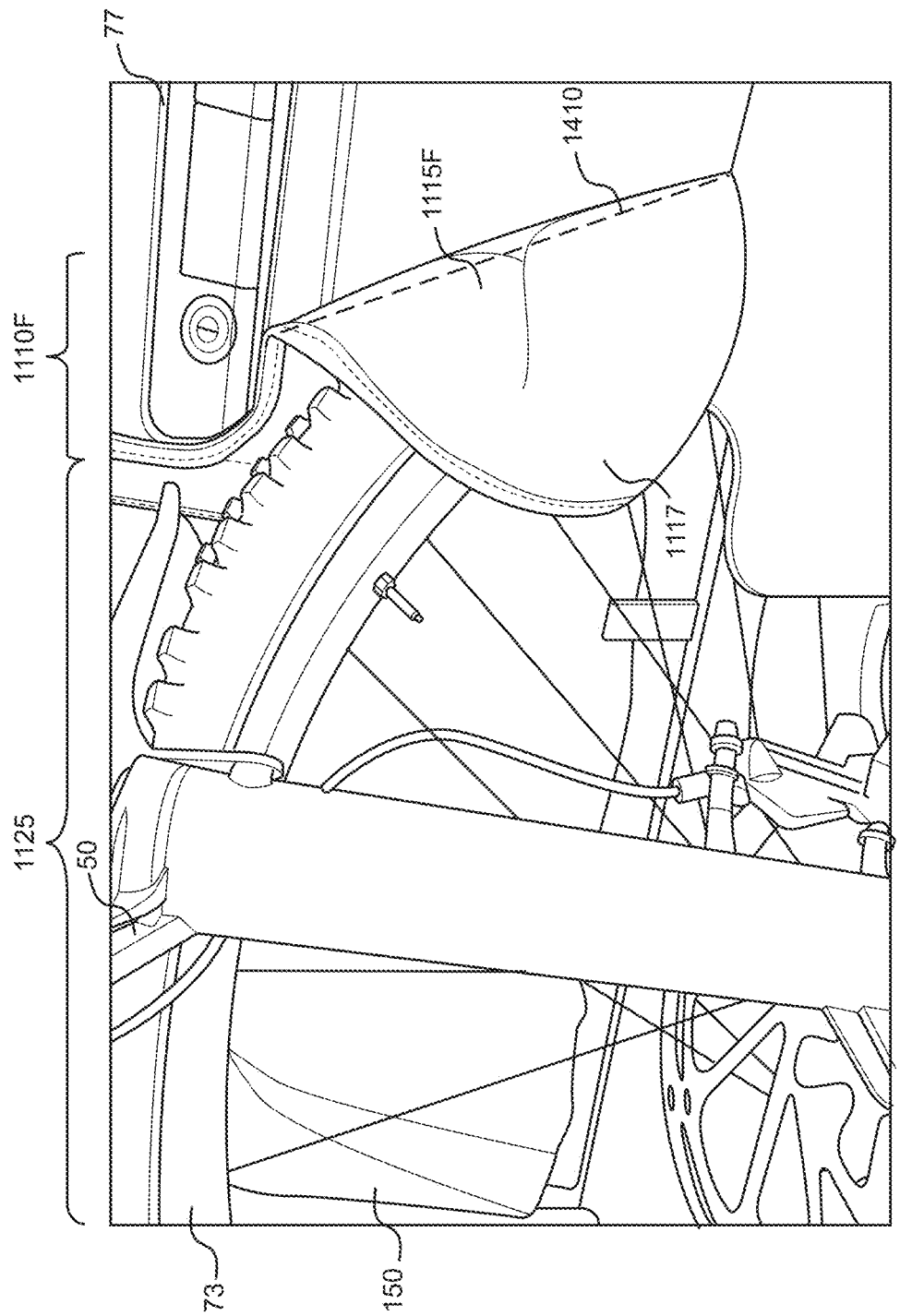
FIG. 14 is a perspective view of the adjustable partial tailgate pad with a fold out panel disposed about a tailgate and a bicycle disposed about the adjustable partial tailgate pad, in accordance with one embodiment.

In one embodiment, front side 102 of adjustable partial tailgate pad 150 has a plurality of pads, typically shown as 1102a-1102c, coupled thereto. In one embodiment, pads 1102a-1102c are used to retain and/or support a portion of bicycle 50 (e.g., by providing a location for resting a wheel 73 (as shown in FIG. 14) of bicycle 50 thereon).

In one embodiment, pads 1102a-1102c are slightly offset from retaining blocks 302a-302c as shown by offset 93. In one embodiment, offset 93 accounts for the fork's crown-steerer unit (CSU) offset.

Although three pads 1102a-1102c are shown in one embodiment, in various embodiments, adjustable partial tailgate pad 150 will have more than three pads. Further, in some embodiments, adjustable partial tailgate pad 150 will have less than three pads. Additionally, in some embodiments, the location and/or the spacing between the plurality of pads 1102a-1102c coupled to adjustable partial tailgate pad 150 will differ from the location and/or spacing of pads 1102a-1102c as depicted in FIG. 11.

With reference still to FIG. 11, in various embodiments, adjustable partial tailgate pad 150 includes a fold out panel 1115 formed in front side 102. In one embodiment, the fold out panel 1115 is removably attached to the adjustable partial tailgate pad 150. The removable attachment can be implemented by means of a zipper, a hook-and-loop fastener, a hook and eye fastener, snap fasteners, buckles, clips, magnetic fasteners, Block Tapey, and the like.

In one embodiment, when the fold out panel 1115 is removably attached to the adjustable partial tailgate pad 150, the fold out panel 1115 further includes at least one protective portion extending over the fastener to protect the tailgate and/or the vehicle from scratching against the fastener. The removable attachment of the fold out panel allows for easy cleaning and/or washing of the panel if it gets dirty due to a contact with a vehicle tire. In one embodiment, the fold out panel 1115 is permanently attached to the adjustable partial tailgate pad 150. In one embodiment, tailgate facing surfaces and/or exterior surfaces of the tailgate pad includes anti-slipping features configured to prevent slipping of the pad. In some embodiments, the anti-slipping features may be rubber or silicone pads, or the like.

Figure 13A:
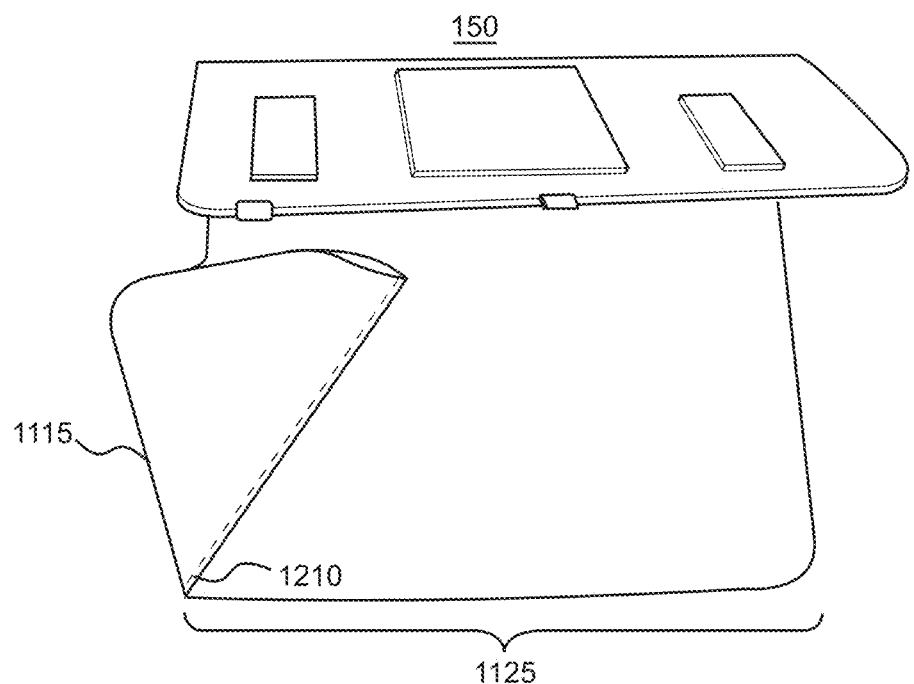
FIG. 13a is a perspective view of an adjustable partial tailgate pad with a fold out panel in a stowed configuration, in accordance with one embodiment.
Figure 13B:
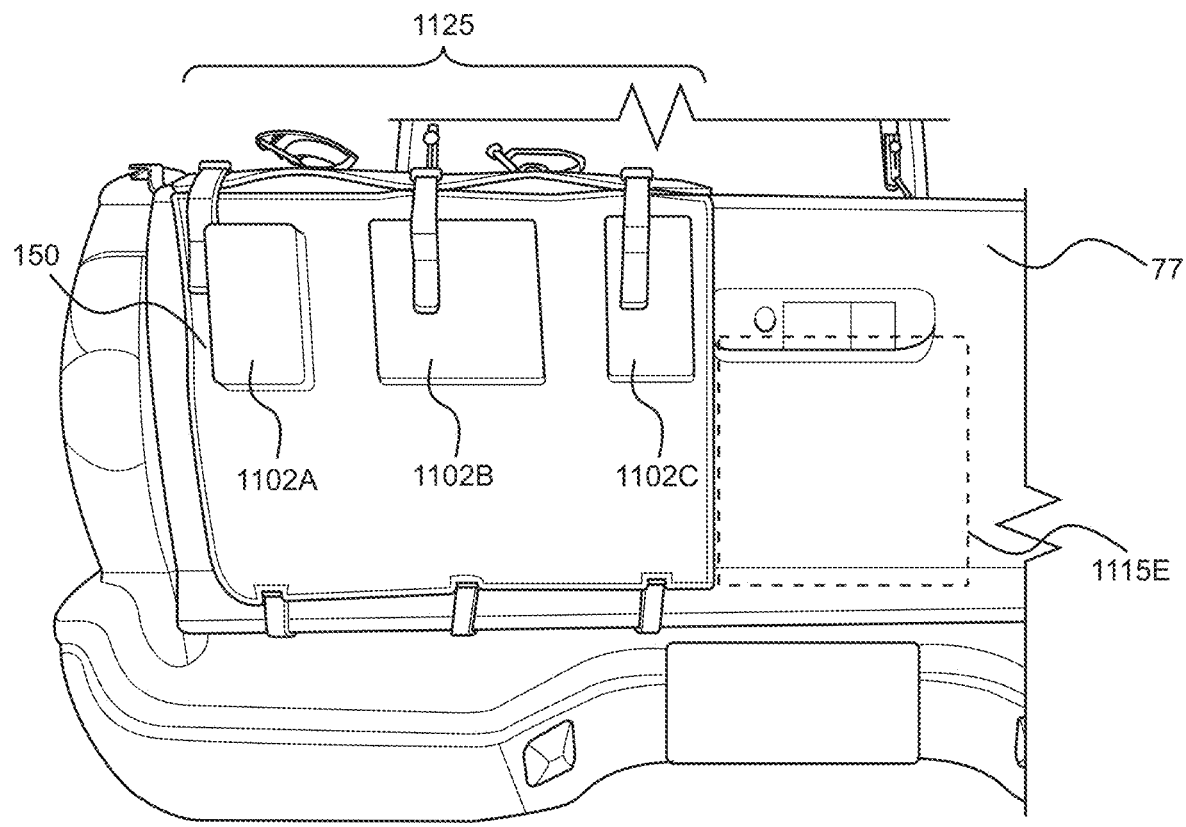
FIG. 13b is a perspective view of the adjustable partial tailgate pad with a fold out panel in a stowed configuration disposed about a tailgate, in accordance with one embodiment.

In one embodiment, front side 102 includes an optional fold out panel retainer 1118 for retaining fold out panel 1115 when it is in a stowed configuration as shown in further detail herein with the accompanying FIGS. 13a and 13b. In one embodiment, adjustable partial tailgate pad 150 does not include optional fold out panel retainer 1118 and instead one or more of front side straps 112a-112n will hold fold out panel 1115 in its stowed configuration.

In one embodiment, fold out panel 1115 includes a retaining feature 1117. In various embodiments as described in further detail herein, when fold out panel 1115 is in an extended configuration it will provide protection from unwanted scratching and/or damage to the tailgate caused by the wheels of one or more bicycles.

In one embodiment, fold out panel 1115 of adjustable partial tailgate pad 150 is somewhat rectangular in shape having an extended configuration length 1110 and an extended configuration height 1112. In one embodiment, fold out panel 1115 extends from a lower portion of front side 102 of adjustable partial tailgate pad 150 such that when in its extended configuration, fold out panel 1115 will not interfere with and/or cover a tailgate handle, a tailgate-mounted backup camera, or other tailgate features.

Although such a location of fold out panel 1115 is shown in the embodiment of FIG. 11, in some embodiments, adjustable partial tailgate pad 150 will have fold out panel 1115 disposed in front side 102 at a location other than as depicted in FIG. 11. Further, in some embodiments, fold out panel 1115 of adjustable partial tailgate pad 150 will have a non-rectangular shape. Fold out panel 1115 of adjustable partial tailgate pad 150 will be discussed, in detail, further below.

Figure 12A:
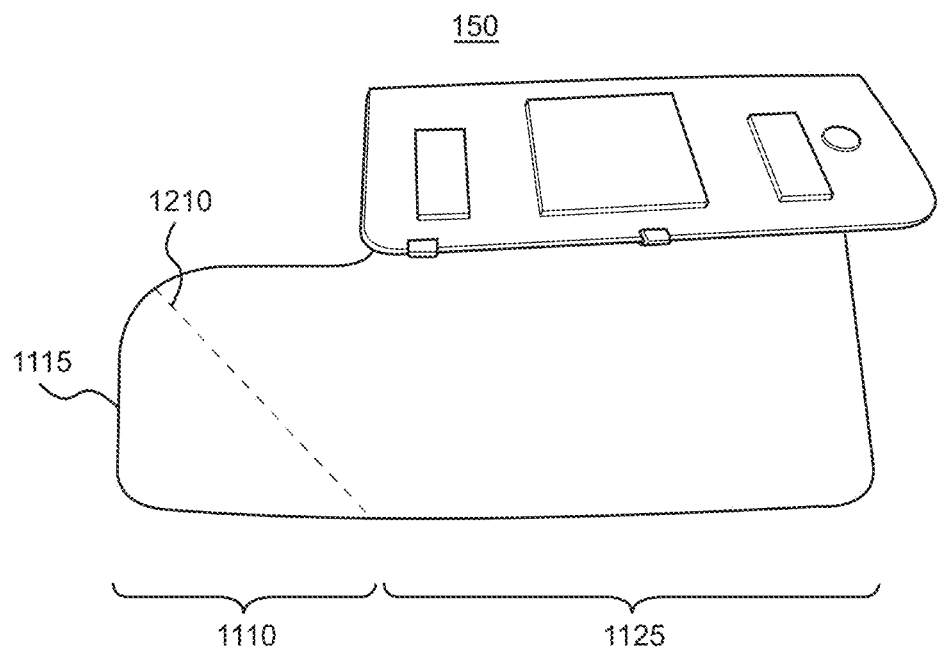
FIG. 12a is a perspective view of an adjustable partial tailgate pad with a fold out panel in an extended configuration, in accordance with one embodiment.

With reference now to FIG. 12a, a perspective view of adjustable partial tailgate pad 150 with fold out panel 1115 in an extended configuration is shown in accordance with one embodiment. In one embodiment, fold out panel 1115 includes a folding axis 1210. When in the extended configuration, fold out panel 1115 has a length 1110.

Figure 12B:
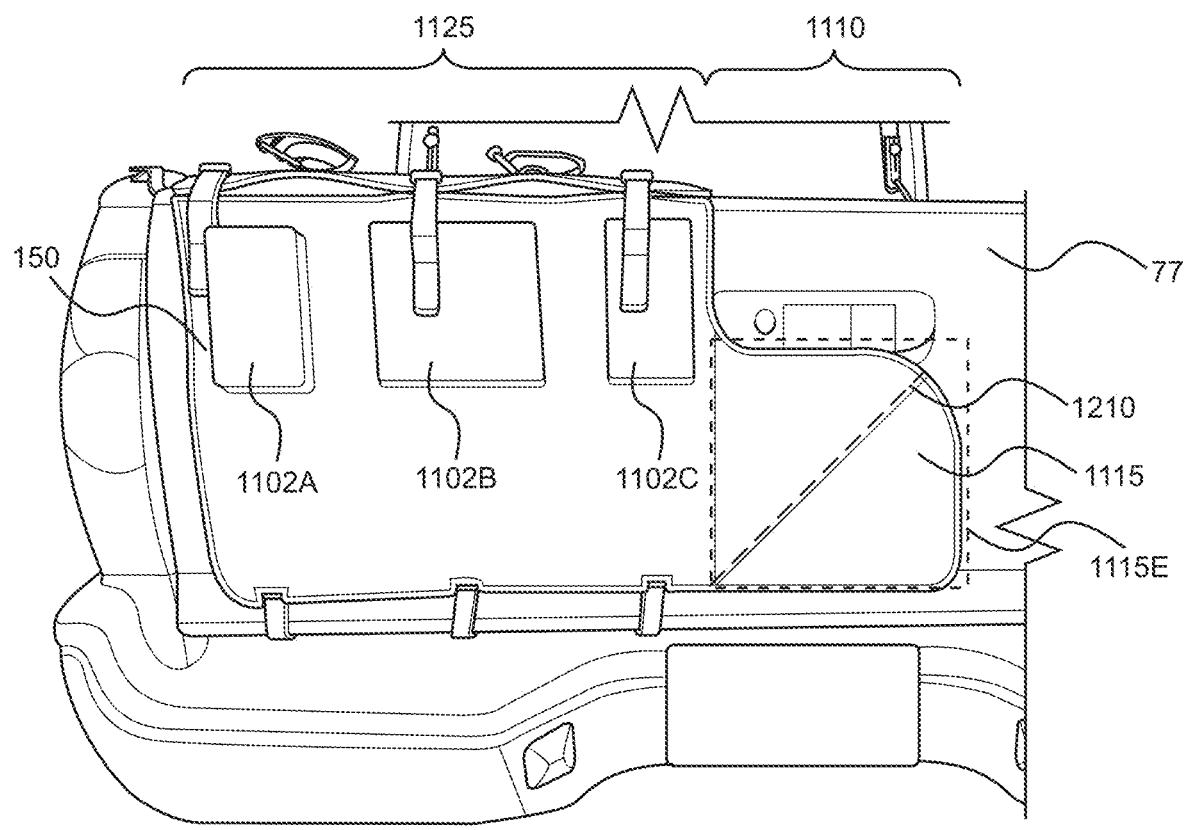
FIG. 12b is a perspective view of the adjustable partial tailgate pad with a fold out panel in an extended configuration disposed about a tailgate, in accordance with one embodiment.

Referring now to FIG. 12b, a perspective view of the adjustable partial tailgate pad 150 with fold out panel 1115 in an extended configuration disposed about tailgate 77 is shown in accordance with one embodiment. In one embodiment, and for purposes of clarity folding axis 1210 of fold out panel 1115 is shown. However, when in the extended configuration, fold out panel 1115 will take up the area indicated by box 1115e and will have a length 1110.

With reference now to FIG. 13a, a perspective view of adjustable partial tailgate pad 150 with fold out panel 1115 in a stowed configuration is shown in accordance with one embodiment. In one embodiment, when being stowed (or retracted), fold out panel 1115 will fold along folding axis 1210 such that the interior lining, e.g., the soft material on the inner or tailgate-facing surface is facing the inside. In so doing, even when in a stowed configuration, fold out panel 1115 will not provide any scratching surface on the paint of tailgate 77.

Referring now to FIG. 13b, a perspective view of adjustable partial tailgate pad 150 with fold out panel 1115 in a stowed configuration disposed about a tailgate is shown in accordance with one embodiment. In one embodiment, and for purposes of clarity the area indicated by box 1115e (e.g., the extended area taken up when fold out panel 1115 is in its extended configuration) is shown. However, as is apparent, when stowed, fold out panel 1115 will add no length to the length 1125 of adjustable partial tailgate pad 150.

With reference now to FIG. 14, a perspective view of adjustable partial tailgate pad 150 with a fold out panel 1115 disposed about a tailgate 77 and a bicycle 50 disposed about the adjustable partial tailgate pad 150 is shown in accordance with one embodiment. In one embodiment, after the bicycle 50 (or bicycles) is mounted on adjustable partial tailgate pad 150, fold out panel 1115 is folded over the exterior most bicycle wheel 73 about folding axis 1410. Once folded over a portion of the exterior most bicycle wheel 73, fold out panel 1115 is formed into a wheel retaining position 1115f and held in wheel retaining position 1115f via retaining feature 1117. In one embodiment, by placing fold out panel 1115 about a portion of the exterior most bicycle wheel 73 and retaining it with retaining feature 1117, the wheel retaining position 1115f of fold out panel 1115 will provide a number of significant advantages.

One advantage is that by retaining the exterior most bicycle wheel 73, any other bicycle wheels that are between the pads 1102a-1102c of adjustable partial tailgate pad 150 and exterior most bicycle wheel 73 will be held in place (e.g., unable to move around or smack into tailgate 77) by the retention forces of fold out panel 1115 as it is coupled with a portion of the exterior most bicycle wheel 73 in wheel retaining position 1115f.

Another advantage is that by retaining a portion of the exterior most bicycle wheel 73 with fold out panel 1115 in wheel retaining position 1115f, the movement of exterior most bicycle wheel 73 will be reduced (e.g., unable to move around or smack into tailgate 77) by the retention forces of fold out panel 1115 in wheel retaining position 1115f.

Moreover, if exterior most bicycle wheel 73 does have any movement and/or contact with tailgate 77 while it is being retained by fold out panel 1115, wheel retaining position 1115f of fold out panel 1115 will provide a level of padding and protection for both tailgate 77 and bicycle wheel 73 to include rubbing, scratching, and or denting protection.

In one embodiment, fold out panel 1115 may be added to one or both sides of adjustable tailgate pad 100 to provide the same or similar features, services, and capabilities as those discussed in the fold out panel 1115 operation as described with respect to adjustable partial tailgate pad 150.

In one embodiment, the adjustable tailgate pad includes a front side, a back side, and a top side. The top side comprises at least two separate parts. Each part is respectively attached at one edge to the back side or the front side of the tailgate pad so that the other end of each part is free. Each part of the top side is configured to attach to the free end of the other part. The attachment of one part of the top side to the other one can be implemented by magnetic fasteners, hook-and-loop fasteners, snap fasteners, hook and eye fasteners, buttons, clips, Block Tapey, or the like. In one embodiment, the at least one part of the top side can be overlapped with the other part of the top side to adjust the width of the top side. In one embodiment, at least one piece of the top side further comprises a protective portion extending over at least one fastener to protect the tailgate surface from damage.

In one embodiment, the tailgate pad is not adjustable.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the Claims that follow.

We claim the following:

1. An adjustable tailgate pad comprising:
   a front side;
   a back side;
   an adjustable top side coupled to said front side and said back side, said adjustable top side having an adjustable width; wherein the adjustable top side comprises at least two parts, wherein
each part of the top side comprises a fastener to attach one part of the top side to the other part of the top side.

2. The tailgate pad of claim 1, wherein at least one part of the top side is configured to overlap with the other part of the top side to adjust the width of the top side.

3. The tailgate pad of claim 1, wherein the tailgate pad comprises at least one top side strap coupled to said adjustable top side, the at least one top side strap configured to adjust said adjustable width of said adjustable top side.

4. The tailgate pad of claim 1, wherein at least one part of the top side comprises a protective portion extending over at least one fastener to protect the tailgate surface from damage.

5. The tailgate pad of claim 1, further comprises a plurality of retaining blocks disposed on said back side of said adjustable tailgate pad.

6. The tailgate pad of claim 1, further comprises a fold out panel coupled with said front side, said fold out panel to wrap about at least a portion of a wheel of a vehicle.

7. The tailgate pad of claim 6, wherein the fold out panel is removably attached with said front side.

8. The tailgate pad of claim 1, further comprising a plurality of retaining straps coupled to said adjustable tailgate pad, said plurality of retaining straps configured to support a vehicle in a desired position with respect to said adjustable tailgate pad.

9. The tailgate pad of claim 1, further comprising padding disposed between the exterior-facing surface and the tailgate-facing surface of at least one of front side, back side or top side.

10. The tailgate pad of claim 6, wherein said fold out panel is stowable between said front side of said adjustable tailgate pad and a tailgate.

11. The tailgate pad of claim 1, further comprising a plurality of pads disposed on said front side of said adjustable tailgate pad.

12. An adjustable tailgate pad comprising:
a front side;
a back side;
an adjustable top side coupled to said front side and said back side, said adjustable top side having an adjustable width; wherein
the adjustable top side comprises at least two parts, wherein
at least one part of the top side is configured to overlap with the other part of the top side to adjust the width of the top side.

13. The tailgate pad of claim 12, wherein the tailgate pad comprises at least one top side strap coupled to said adjustable top side, the at least one top side strap configured to adjust said adjustable width of said adjustable top side.

14. The tailgate pad of claim 12, wherein each part of the top side comprises a fastener to attach one part of the top side to the other part of the top side.

15. The tailgate pad of claim 12, wherein at least one part of the top side comprises a protective portion extending over at least one fastener to protect the tailgate surface from damage.

16. The tailgate pad of claim 12, further comprising padding disposed between the exterior-facing surface and the tailgate-facing surface of at least one of front side, back side or top side.

17. The tailgate pad of claim 12, further comprising a plurality of pads disposed on said front side of said adjustable tailgate pad.

18. The tailgate pad of claim 12, further comprises a fold out panel coupled with said front side, said fold out panel to wrap about at least a portion of a wheel of a vehicle.

19. The tailgate pad of claim 18, wherein the fold out panel is removably attached with said front side.

20. The tailgate pad of claim 18, wherein said fold out panel is stowable between said front side of said adjustable tailgate pad and a tailgate.

* * * * *